(12) United States Patent
Wakamatsu et al.

(10) Patent No.: US 7,553,467 B2
(45) Date of Patent: Jun. 30, 2009

(54) TUBULAR REACTION VESSEL AND PROCESS FOR PRODUCING SILICON THEREWITH

(75) Inventors: Satoru Wakamatsu, Shunan (JP); Shigeki Sugimura, Shunan (JP); Yasuo Nakamura, Shunan (JP); Kenichi Tsujio, Shunan (JP)

(73) Assignee: Tokuyama Corporation, Shunan-shi, Yamaguchi (JP)

(*) Notice: Subject to any disclaimer, the term of this patent is extended or adjusted under 35 U.S.C. 154(b) by 49 days.

(21) Appl. No.: 10/567,943

(22) PCT Filed: Aug. 11, 2004

(86) PCT No.: PCT/JP2004/011542

§ 371 (c)(1), (2), (4) Date: Feb. 10, 2006

(87) PCT Pub. No.: WO2005/016820

PCT Pub. Date: Feb. 24, 2005

(65) Prior Publication Data
US 2006/0219161 A1   Oct. 5, 2006

(30) Foreign Application Priority Data
Aug. 13, 2003   (JP)   ............................. 2003-293197

(51) Int. Cl.
*C01B 33/03* (2006.01)
*C23C 16/24* (2006.01)
*C23C 16/46* (2006.01)

(52) U.S. Cl. ........................ 423/349; 118/725

(58) Field of Classification Search ................ 423/349, 423/324; 117/204, 205, 31, 33, 35; 422/139, 422/145, 198, 211; 118/725
See application file for complete search history.

(56) References Cited

U.S. PATENT DOCUMENTS

| 4,374,093 A | * | 2/1983 | Rollmann et al. ........... 422/202 |
| 4,547,258 A | | 10/1985 | Witter et al. |
| 4,710,260 A | | 12/1987 | Witter et al. |
| 5,146,869 A | * | 9/1992 | Bohannon et al. ........... 118/724 |
| 6,861,144 B2 | | 3/2005 | Wakamatsu et al. |

FOREIGN PATENT DOCUMENTS

| JP | 59-162117 A | 9/1984 |
| JP | 2002-029726 A | 1/2002 |
| JP | 2003-20217 A | 1/2003 |

* cited by examiner

*Primary Examiner*—Wayne Langel
*Assistant Examiner*—Brittany M Martinez
(74) *Attorney, Agent, or Firm*—The Webb Law Firm

(57) ABSTRACT

There is provided a reaction vessel whereby silicon produced can be smoothly recovered dropwise without excessive thermal load on constitutional parts of the reaction vessel, a silicon deposition feedstock gas can be reacted efficiently even when the reaction vessel is scaled up to industrial large-scale equipment, generation of silicon fine powder and silane oligomers can be suppressed, and industrial silicon production can be performed over extended periods. The tubular reaction vessel comprises a longitudinally-extending wall with a space thereinside, wherein a silicon deposition feedstock gas inflow opening and a deposited silicon discharge opening are provided at an upper portion and a lower end portion respectively, and a flow resistance-increasing region is created on a wall surface of the tubular reaction vessel that is contacted with a feedstock gas. The flow resistance-increasing region is at least one of protrudent, concave and sloped regions.

1 Claim, 21 Drawing Sheets

A-A' Cross section

A-A' Cross section

B-B' Cross section

A-A' Cross section

B-B' Cross section

TUBULAR REACTION VESSEL AND PROCESS FOR PRODUCING SILICON THEREWITH

FIELD OF THE INVENTION

The present invention relates to a novel reaction vessel for producing silicon from a silicon deposition feedstock gas containing a chlorosilane and hydrogen. More particularly, the invention relates to a reaction vessel that permits stable and efficient silicon production over extended periods and enables reduction of by-products to an extremely low level. The invention also relates to a silicon production process using the reaction vessel.

BACKGROUND OF THE INVENTION

There are many known processes for producing polycrystalline silicons used as semiconductors and photovoltaic cell materials, and some processes are performed in the industry.

One of such processes is the so-called Siemens process, in which a silicon rod heated by energization to a silicon deposition temperature is placed in a bell jar, and trichlorosilane ($SiHCl_3$, hereinafter TCS) or monosilane ($SiH_4$) together with a reducing gas such as hydrogen are brought into contact with the rod to deposit silicon.

This process provides high-purity silicon and is performed most commonly. Because of batchwise deposition, however, the process has a problem of a very complicated procedure including placement of the silicon rod as a seedbed, energization heating, deposition, cooling and takeout of the silicon rod, as well as bell jar washing.

To solve the above problem, the present applicant has proposed a silicon production reactor capable of producing silicon continuously and stably over extended periods (Patent Document 1, JP-A-2002-29726). The reactor is structured such that a silicon deposition feedstock gas is supplied into a tubular reaction vessel resistant to temperatures in excess of the melting point of silicon, the tubular reaction vessel is heated to deposit silicon, and the deposited silicon is molten and continually drips down from the lower end of the tubular reaction vessel and is recovered.

This reactor is very advantageous in that the conventional problems with the Siemens process are solved and silicon is produced continually. However, it has been revealed that the tubular reaction vessels disclosed in Examples of Patent Document 1 that have a simple internal structure circular or polygonal in cross section cause a lowered reaction rate of the feedstock gas when the vessels are scaled up without any modification for industrial-scale production of more than several hundreds of tons of silicon annually.

Furthermore, the scale-up tends to increase the probability of generation of by-products such as silicon fine powder and silane oligomers, resulting in lower silicon yields. Moreover, the by-products often adhere to a reaction gas discharge line to cause blockage. Therefore, improvements of these problems have been desired.

Filling a reaction vessel with a filler or the like is known as means for increasing the reaction efficiency of the feedstock gas (Patent Document 2, JP-A-S59-162117).

However, the following problem is often encountered. The silicon deposition reaction vessel is generally heated inside by heat conduction from external heating means, and therefore heat cannot reach deep into the filler layer. As a result, a great temperature difference is caused within the filler layer between the vicinity of the reaction vessel wall and the vicinity of the filler layer central axis.

Sufficient heating to the vicinity of the central axis is particularly difficult with a scaled-up large diameter reaction vessel, even with the use of heating means such as a high-frequency induction heating system or a dielectric heating system which relatively facilitates deep heating, and then, ultimately, a solid deposit clogs the filler layer. When the heating output is increased to solve the above problem, a vicinity of the heating means, for example the external wall of the reaction vessel, is heated to an extremely high temperature, so that the reaction vessel material is remarkably deteriorated, leading to a new problem such as difficult long-term operation.

Patent Document 1: JP-A-2002-29726

Patent Document 2: JP-A-S59-162117

SUMMARY OF THE INVENTION

It is therefore an object of the present invention to provide a reaction vessel whereby silicon produced can be smoothly recovered dropwise without excessive thermal load on constitutional parts of the reaction vessel, a silicon deposition feedstock gas can be reacted efficiently even when the reaction vessel is scaled up to industrial large-scale equipment, generation of silicon fine powder and silane oligomers can be suppressed, and industrial silicon production can be performed over extended periods.

The present inventors studied earnestly to solve the aforementioned problems. As a result, they have found that a specific phenomenon attributed to operation conditions is responsible for the lowered reaction rate of the silicon deposition feedstock gas (hereinafter, feedstock gas) and increased by-products encountered when scaling up the reaction vessel of Patent Document 1.

Even when the reaction vessel used in Patent Document 1 is scaled up, the Reynolds number indicates that the gas flow is turbulent, thereby, the feedstock gas is supposed to be sufficiently turbulent such that adequate contact efficiency will be ensured. However, the present inventors have found that when a low-temperature feedstock gas is flowed downward into a reaction vessel whose wall (on which silicon will be deposited) has a high temperature, particularly 1200° C. or above, a strong flow occurs near the deposition surface in the opposite (upward) direction to the feedstock gas (downward). This phenomenon becomes more marked as the temperature difference between the wall and the gas increases.

Consequently, the upward flow blocks diffusion of the feedstock gas to the deposition surface and the feedstock gas reaction efficiency is just lowered, but, accidental local gas turbulence brings part of the high-temperature upward flow into contact with part of the low-temperature feedstock gas, with formation of by-products. Moreover, the upward flow reduces the possibility that the formed by-products will be recontacted with the deposition surface, so that most of the by-products are discharged from the reaction vessel.

The present inventors further studied to scale up the Patent Document 1 reaction vessel while maintaining the reaction efficiency and preventing occurrence of the by-products. By providing the reaction vessel internal wall with a flow resistance-increasing region, not only the diffusion-blocking upward flow can be effectively diminished but also the feedstock gas in the vicinity of the reaction vessel central axis can be effectively mixed with the upward flow. As a result, they have succeeded in achieving both improvement of the feedstock gas reaction efficiency and prevention of the by-products.

The present inventors have further found the following. That is, the feedstock gas can be effectively contacted with the deposition surface as described above, thereby, silicon fine powder and the like can be recontacted with the deposition surface and be incorporated in the deposit. Moreover, because the feedstock gas supplied is uniformly heated to high temperatures, the silane oligomer can be re-decomposed, therefore, the by-products discharged from the reaction vessel can be dramatically reduced.

The present inventors further studied and found that reduction of temperature variation in the reaction vessel internal wall, reduction of flow resistance of the feedstock gas, and smooth drop of the silicon melt are achieved when the shape, size and arrangement of the flow resistance-increasing regions are adequately setting. The present invention has been completed based on the aforesaid findings.

Furthermore, since the contact efficiency of the feedstock gas with the reaction vessel wall is equalized throughout the reaction vessel, the output distribution of heating apparatus can also be leveled out, leading to reduced operating cost.

Thus, a tubular reaction vessel according to the present invention comprises a longitudinally-extending wall with a space thereinside, wherein a silicon deposition feedstock gas inflow opening and a deposited silicon discharge opening are provided at an upper portion and a lower end portion respectively, and a flow resistance-increasing region is created on a wall surface of the tubular reaction vessel that is contacted with a feedstock gas. According to the present invention, the feedstock gas can be uniformly and sufficiently heated by means of a very large deposition surface inside the reaction vessel, so that the potential silicon production capability of the feedstock gas can be fully educed while preventing by-products, thereby, the present invention achieves both high silicon production efficiency and long-term stable operation.

The flow resistance-increasing region is preferably at least one of protrudent, concave and sloped regions. With the thus-shaped flow resistance-increasing region, the silicon deposition reaction vessel can be scaled up to industrial large-scale equipment while permitting the silicon deposition feedstock gas to react effectively and silicon to be mass produced stably over a long term.

Preferably, the flow resistance-increasing region is a protrusion provided in the tubular reaction vessel, and the reaction vessel is reduced in thickness from the external wall in the protrusion-provided area. Further, in a preferred embodiment, the flow resistance-increasing region is a protrusion provided in the tubular reaction vessel, and the tubular reaction vessel is arranged to be heated by a high frequency heating coil and includes means for reducing high frequency energy from the high frequency heating coil in the protrusion-provided area relative to the other area.

The invention enables effective reduction of the upward flow by causing it to contact with the flow resistance-increasing region on the internal wall of the tubular reaction vessel to change the flow direction. The flow resistance-increasing region also allows for effective mixing of the feedstock gas with the upward flow in the vicinity of the central axis of the tubular reaction vessel.

Consequently, the upward flow acting as a boundary layer is eliminated, and the feedstock gas can contact with the internal wall of the tubular reaction vessel with improved efficiency and can be heated uniformly. Furthermore, the feedstock gas can be effectively contacted with the deposition surface and, even when silicon fine powder is generated, the fine powder is recontacted with the deposited silicon surface and is incorporated therein, in addition, the feedstock gas can be heated uniformly to a high temperature, so that the silane oligomer generated can be redecomposed, thereby, the by-products discharged from the reaction vessel can be dramatically reduced. Thus, improvement of the reaction efficiency and prevention of by-products can be achieved.

DETAILED DESCRIPTION OF THE INVENTION

Hereinbelow, representative embodiments of the present invention will be described with reference to the attached drawings. However, the invention is not limited to the illustrated embodiments.

FIGS. 1 to 16 are schematic views illustrating embodiments of tubular reaction vessels according to the present invention.

Figure 1:
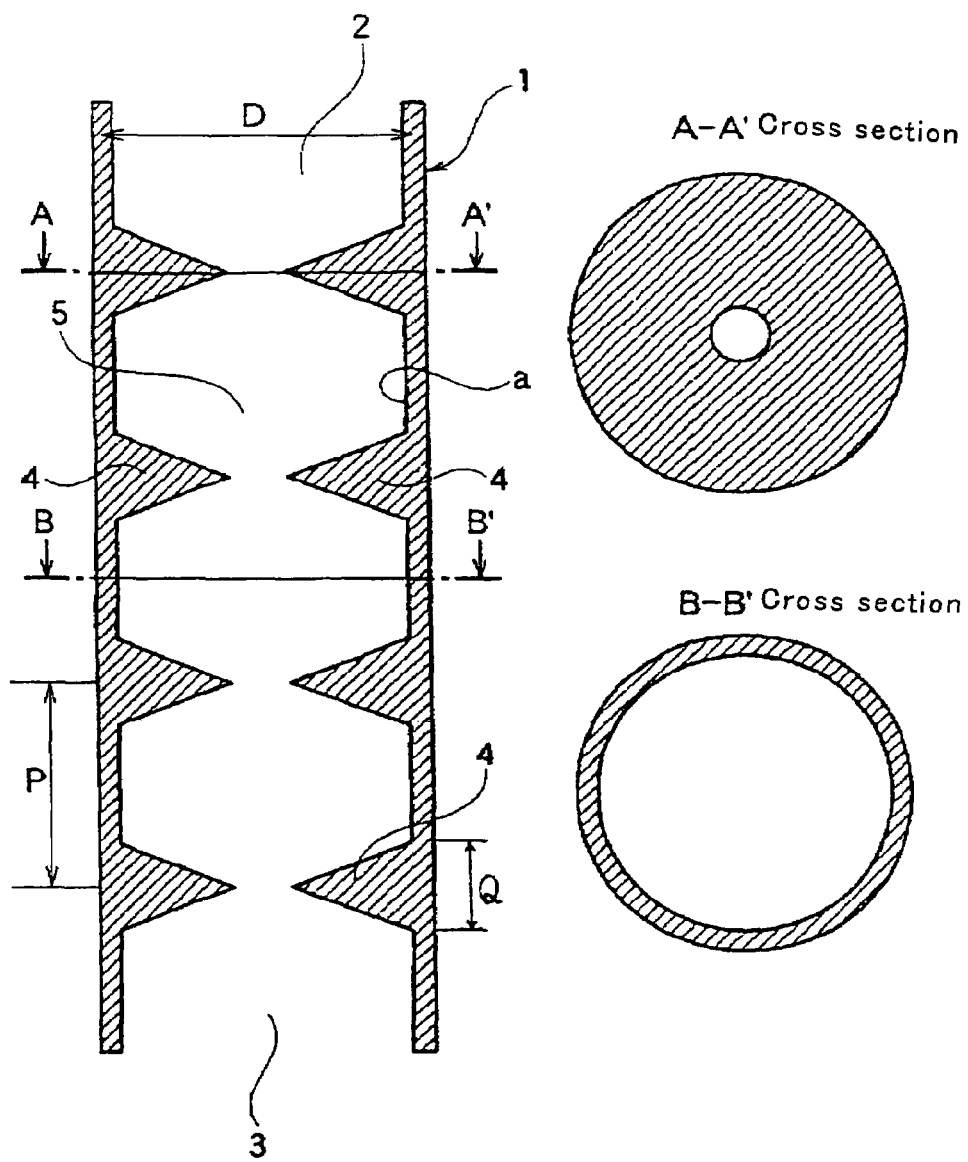
FIG. 1 is a schematic sectional view showing a representative embodiment of a tubular reaction vessel according to the present invention.

FIG. 1 is a schematic sectional view of a basic embodiment of a tubular reaction vessel according to the present invention. (FIG. 1 is a vertical sectional view of the tubular reaction vessel.)

In FIG. 1, the numeral 1 denotes a tubular reaction vessel, 2 denotes a silicon deposition feedstock gas inflow opening, 3 denotes a deposited silicon discharge opening, 4 denotes a flow resistance increasing region, and 5 denotes a space through which the silicon deposition feedstock gas is passed. The tubular reaction vessel 1 shown in FIG. 1 has the silicon deposition feedstock gas inflow opening 2 and the deposited silicon discharge opening 3, and is provided with the flow resistance-increasing regions 4 on a wall surface with which the feedstock gas is contacted. In the figure, the section along the line A-A' is of an area formed with the flow resistance-increasing region at a right angle to the longitudinal direction; the section along the line B-B' is of an area without the flow resistance-increasing region.

Figure 2:
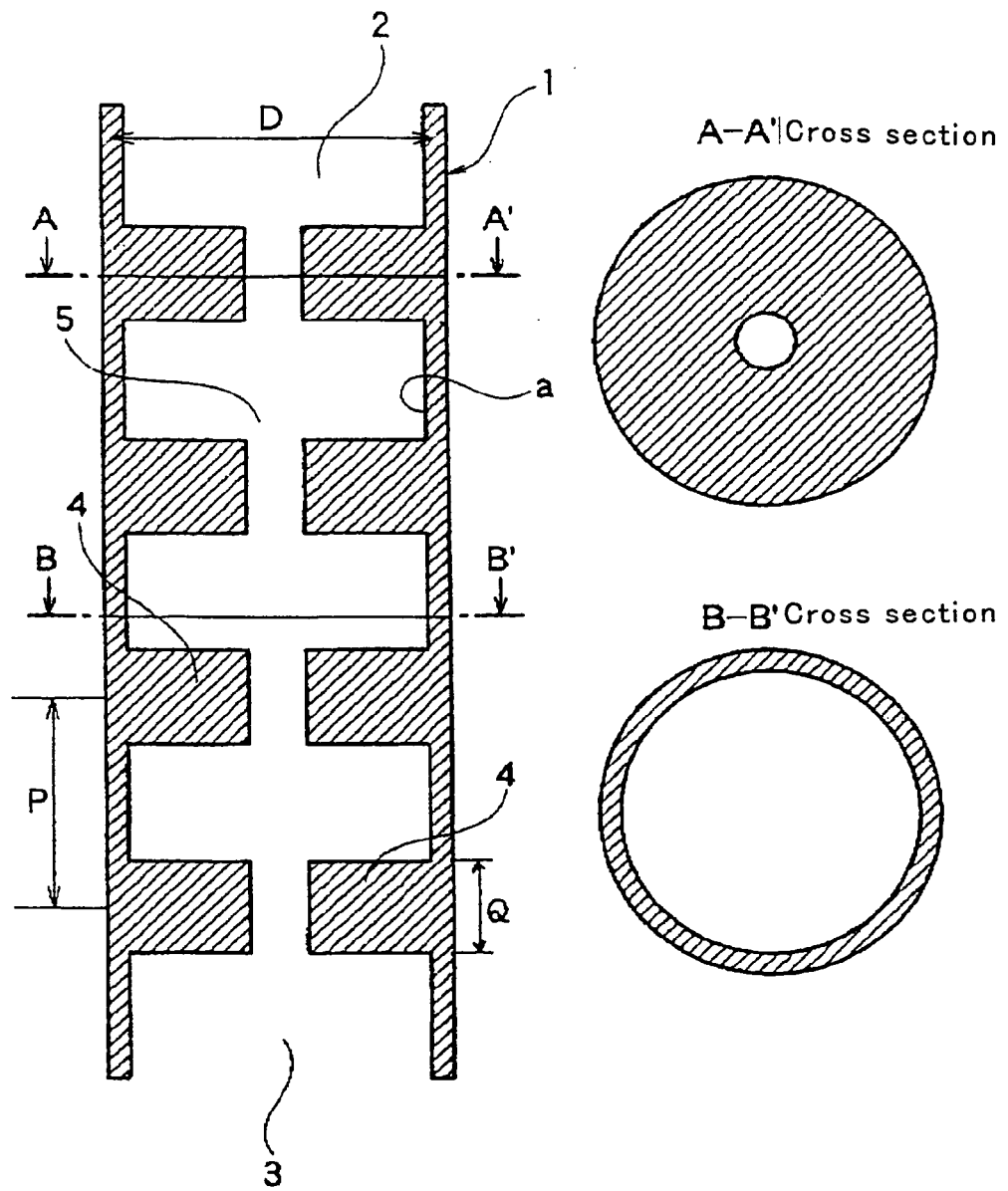
FIG. 2 is a schematic sectional view showing another representative embodiment of the tubular reaction vessel according to the present invention.

FIG. 2 is a schematic sectional view showing another embodiment of the tubular reaction vessel according to the present invention. The numerals in FIG. 2 indicate the same items as in FIG. 1.

The flow resistance-increasing regions shown in FIG. 1 are ring-shaped protrusions triangular in cross section, provided on the internal wall of the tubular reaction vessel (hereinbelow, the ring-shaped protrusions on the internal wall of the tubular reaction vessel will be referred to as orifices) In FIG. 2, the orifices rectangular in cross section are provided on the internal wall.

One or more flow resistance-increasing regions 4 will be suitably provided depending on the size of the tubular reaction vessel. The intervals at which the flow resistance-increasing regions are provided may be regular as shown in FIGS. 1 and 2, or may be specifically determined irregular intervals. In FIGS. 1 and 2, the orifice height is represented by H, the skirt width by Q, and the orifice interval by P. A detailed description will be given below.

Tubular Reaction Vessel

The tubular reaction vessel 1 comprises a longitudinally-extending wall with a space thereinside. The reaction vessel has a silicon deposition feedstock gas inflow opening and a deposited silicon discharge opening at an upper portion and a lower end portion respectively, and further has a flow resistance-increasing region on a wall surface to be contacted with the feedstock gas. The shape of the reaction vessel is not particularly limited provided that a silicon deposition feedstock gas is supplied through the upper silicon deposition feedstock gas inflow opening 2, that silicon is deposited and molten on a heated surface of the reaction vessel wall (a) facing a space 5, and that an opening (discharge opening 3) is formed at a lower end portion for allowing silicon to drip down by gravity from the vessel.

The cross-sectional shape of the tubular reaction vessel 1 is not particularly limited. For example, the transverse cross section (along the line B-B') of the space 5 is basically circular as shown in FIG. 1 or 2, and may be any shapes such as polygonal shapes including triangular and square shapes.

Figure 13:
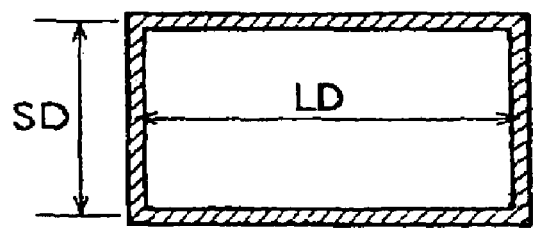
FIG. 13 is a schematic sectional view showing a further representative embodiment of the tubular reaction vessel according to the present invention.

In another embodiment, the transverse cross section of the space 5 may be slit-shaped as illustrated in FIG. 13. Examples of the slit shapes in transverse cross section of the space 5 of the reaction vessel 1 include the rectangular shape as shown in FIG. 13 and, although not shown, corner-rounded polygonal shape, elliptical shape, C-shaped curved rectangular shape, rhomboid shape, one side open square box shape (Π shape), L shape, T shape, cross shape, star shape, S shape and scroll shape.

Figure 14:
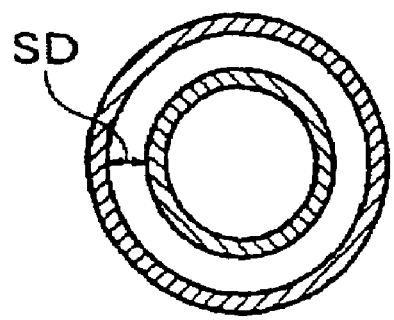
FIG. 14 is a schematic sectional view showing a further representative embodiment of the tubular reaction vessel according to the present invention.

A further example of the slit shapes is a continuous circular slit shape as shown in FIG. 14.

One of the main characteristics of the reaction vessel of the invention is a scale-up property. That is, the reaction vessel of the invention can be scaled up from a laboratory-scale small vessel to a substantially analogous but industrial large-scale vessel, so as to provide reaction results surprisingly similar to laboratory results.

The reaction vessel may be produced by known molding methods. The reaction vessel may consist of an integral body, or two or more parts joined together. A large-scale reaction vessel for industrial use is preferably constructed by connecting structural parts of the tubular reaction vessel, each of which is 1.5 m long at maximum, to obtain as uniform mechanical properties as possible of the tubular reaction vessel material. Connection of the parts may be flange connection. Preferably, the tubular reaction vessels are ditched to create a screw, and are connected together by means of the screws. In the case of the screw connection, it is preferred that the inner surface of the tubular reaction vessel is free from steps. When steps are present, silicon is locally deposited thereon from which breakage of the reaction vessel possibly takes place.

Specifically, the diameter D of the tubular reaction vessel is not particularly limited and may be selected appropriately depending on the silicon production scale, within production conditions of the structural material. The length L of the reaction vessel may be extended as required by screw connecting reaction vessel parts. The length to diameter ratio (L/D) of the tubular reaction vessel, although variable depending on arrangement of the flow resistance-increasing regions, is in the range of 1 to 30, and preferably 3 to 20 in order to achieve a sufficient reaction rate of the feedstock gas and a good silicon yield.

The diameter D of the tubular reaction vessel may be constant at any points as shown in FIGS. 1 to 16. It is also possible, although not shown, that the diameters differ from place to place. In the case of the slit shape, the width may be constant or varied relative to the longitudinal direction (direction L) of the reaction vessel.

The thickness of the tubular reaction vessel is not particularly limited, and will be such that the reaction vessel will have strength enough to support its own weight. That is, the thickness does not need to be unnecessarily large and will suitably range from 5 to 100 mm, and preferably from 10 to 50 mm.

In order that silicon can be appropriately discharged, the silicon discharge opening 3 of the reaction vessel 1 may have a horizontal peripheral edge. It is also appropriate that the peripheral edge is sloped or waved. In a preferred embodiment, the discharge opening 3 is tapered, with the thickness being gradually reduced toward the tip, so that the silicon melt can drip down clear from the discharge opening 3.

The tubular reaction vessel 1 is heated to above the melting point of silicon and the inside of the vessel is contacted with chlorosilane and the silicon melt. To enable long-term stable production of silicon, the vessel is preferably made of a material highly resistant to these temperature conditions and contact.

Such materials include single and composite materials of carbon materials such as graphite, pyrolytic carbon and carbon fiber-reinforced carbon composite materials, and ceramic materials such as silicon carbide (SiC), silicon nitride ($Si_3N_4$), boron nitride (BN) and aluminum nitride (AlN)

Of these materials, isotropic graphite is preferable to constitute the wall (a) of the reaction vessel. To reduce contamination of the deposited silicon, the vessel is preferably coated with pyrolytic carbon, $Si_3N_4$ or SiC at least in the area that is contacted with the silicon melt.

Flow Resistance-Increasing Region

The flow resistance-increasing region is provided to effectively diminish the upward flow which is a layer inhibiting diffusion in the tubular reaction vessel and to effectively mix the feedstock gas in the vicinity of the vessel central axis with the upward flow. The provision of the flow resistance-increasing region achieves both improved reaction rate of the feedstock gas and by-products prevention. The feedstock gas reaction rate is defined as a conversion ratio of the feedstock gas relative to any substance converted therefrom while the feedstock gas is supplied into the space of the tubular reaction vessel 1 and is discharged from the space 5. The silicon yield mentioned later is defined as a conversion ratio of any substance converted from the feedstock gas, relative to the silicon produced.

Specifically, the flow resistance-increasing region 4 may be a protrusion, a concave or a slope, as described below.

1) Protrusion

Protrusion is the most preferable embodiment of the flow resistance-increasing region. The protrusion means a raised portion of the tubular reaction vessel wall protrudent toward the space 5.

In a most preferred embodiment, the protrusion is a ring-shaped protrusion (orifice) circulating on the internal wall of the tubular reaction vessel, as illustrated in the cross section along the line A-A'. The protrusion will be described in detail hereinbelow based on this typical embodiment orifice.

The cross sectional shape of the orifice in a vertical direction (longitudinal direction of the tubular reaction vessel) is not particularly limited. The orifice in cross section may be a triangle as illustrated in FIG. 1, rectangle (oblong) as illustrated in FIG. 2, polygon (not shown), or a top-curved protrusion (not shown).

More preferably, the orifice has a cross sectional shape such that gas stagnation will be less and the silicon melt will flow down smoothly.

Figure 3:
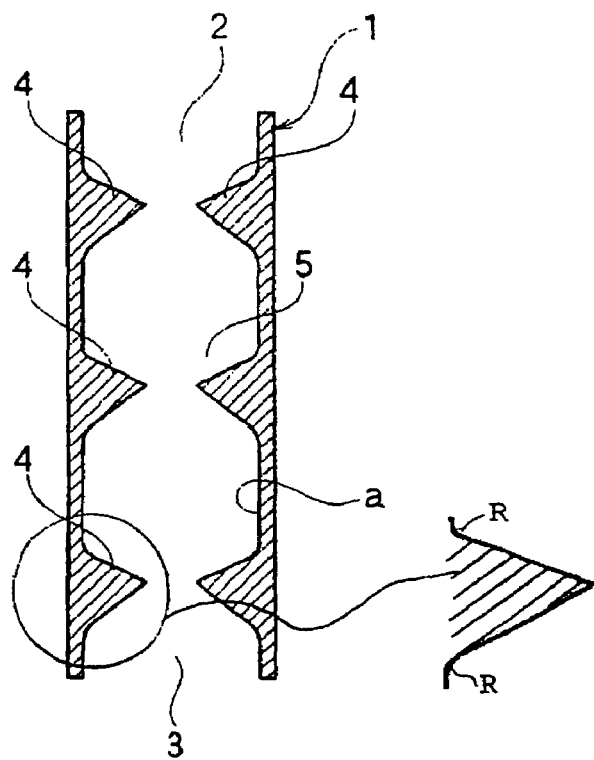
FIG. 3 is a schematic sectional view showing a further representative embodiment of the tubular reaction vessel according to the present invention.

The orifice is more preferably triangle in cross section as illustrated in FIG. 1 because the flow will be difficult when the protrusion has corners. The triangular orifice may have a regular shape such as right-angled triangle or isosceles triangle, or may have an irregular triangle shape. Most preferably, in order that the orifice can effectively function as the flow resistance-increasing region and that the gas stagnation and accompanying temperature rise in the downstream of the orifice can be prevented, the flow resistance-increasing region has a triangular cross section that is sloped more gently in the downstream gas flow side than in the upstream side. That is, as shown in FIG. 3, the exterior angle of the triangle and the wall surface is desirably more obtuse in the downstream side of the gas flow than in the upstream side. In the vertical cross section, although the protrusion and the tubular reaction vessel may have an angled contact point, the contact point is more preferably curved as shown in FIG. 3, with designation R (partially semicircle) in accordance with JIS, so that the silicon melt having a high surface tension can flow down more smoothly. R is preferably in the range of about 5 to 10.

The orifice opening through which the gas is passed may be circular as shown in FIGS. 1 and 2 or, although not shown, elliptical or polygonal.

The orifice opening through which the gas is passed is preferably positioned exactly in the center of the tubular reaction vessel 1 as shown in FIGS. 1 and 2. Namely, the center of the orifice opening preferably meets the central axis of the gas passageway of the tubular reaction vessel. Although not shown, an eccentric opening may be employable. The eccentric opening may cause nonuniform heating, and therefore the opening is desirably positioned on the central axis of the gas passageway.

The orifice blocks part of the gas passageway, so that the gas flow is locally accelerated. As a result, the occurrence of the upward flow is prevented and the feedstock gas can be efficiently mixed with the upward flow in the downstream of the orifice.

The protrusion height H from the tubular reaction vessel internal wall to the orifice tip will be preferably such that the area in which the gas passageway is blocked by the protrusion is 10 to 95%, more preferably 30 to 95%, and optimally 50 to 95% of the cross sectional area of the tubular reaction vessel 1 in the wall provided with the protrusion. When this condition is satisfied, the upward flow being a layer inhibiting diffusion of the feedstock gas can be effectively reduced and the feedstock gas in the vicinity of the tubular reaction vessel central axis can be effectively mixed with the upward flow. Thus, the reaction efficiency of the feedstock gas can be improved and the by-products can be prevented.

The orifice skirt width Q (shown in FIGS. 1 and 2) is preferably 50 to 600%, and more preferably 100 to 400% relative to the protrusion height H. Too large a skirt width Q reduces the effect of the protrusion, and too small a skirt width possibly leads to lowered protrusion strength.

The number of orifices to be provided is determined appropriately depending on the size of the tubular reaction vessel, the flow speed and rate of the feedstock gas, and desired reaction results. One or more orifices, preferably a plurality of orifices are provided. In an optimum embodiment, the number of orifices ranges from 3 to 10.

A plurality of orifices are preferably provided at intervals P that are 100 to 500%, and more preferably 200 to 400% relative to the inner diameter D of the tubular reaction vessel 1. When the intervals P are too small, the protrusions will not produce sufficient effects. Too large intervals reduce the probability that the gas will contact with the wall surface. When the orifices are triangular or curved in cross section, the interval P is a distance between peaks of the height H as shown in FIG. 2. When the cross sectional shape is quadrangular or polygonal with a flat top, the interval P is a distance between central points of the flat areas as shown in FIG. 1.

Next, embodiments of the protrusion arrangement will be described based on various combinations of the orifice height H, skirt width Q and intervals P.

Basically, the protrusion height H, skirt width Q and intervals P are regular as illustrated in FIGS. 1 and 2.

Figure 4:
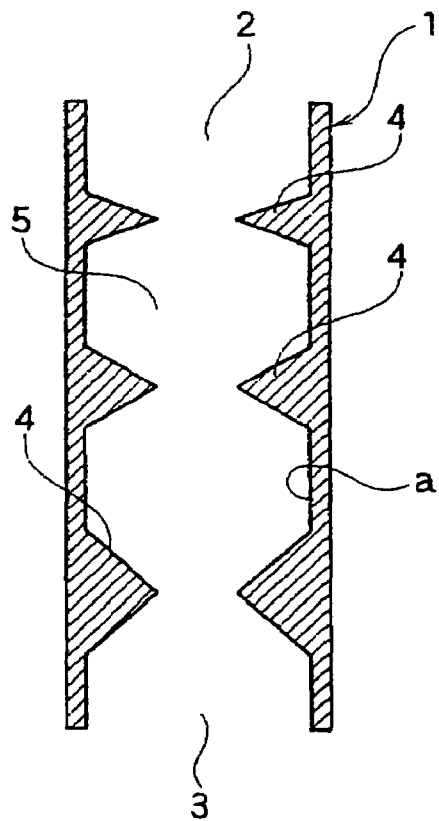
FIG. 4 is a schematic sectional view showing a further representative embodiment of the tubular reaction vessel according to the present invention.

In another embodiment, the skirt width Q alone is changed as shown in FIG. 4, in which the more downstream of the gas passageway the protrusion, the greater the skirt width Q. Although not shown, the embodiment of FIG. 4 may be turned upside down so that the skirt width Q narrows toward the downstream of the gas passageway.

Figure 5:
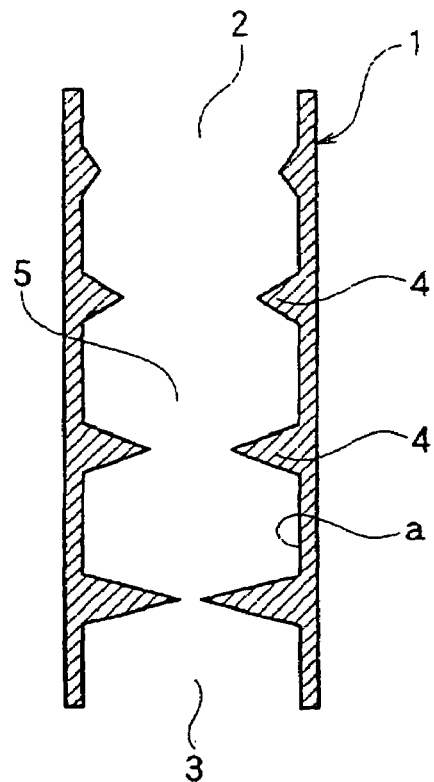
FIG. 5 is a schematic sectional view showing a further representative embodiment of the tubular reaction vessel according to the present invention.
Figure 6:
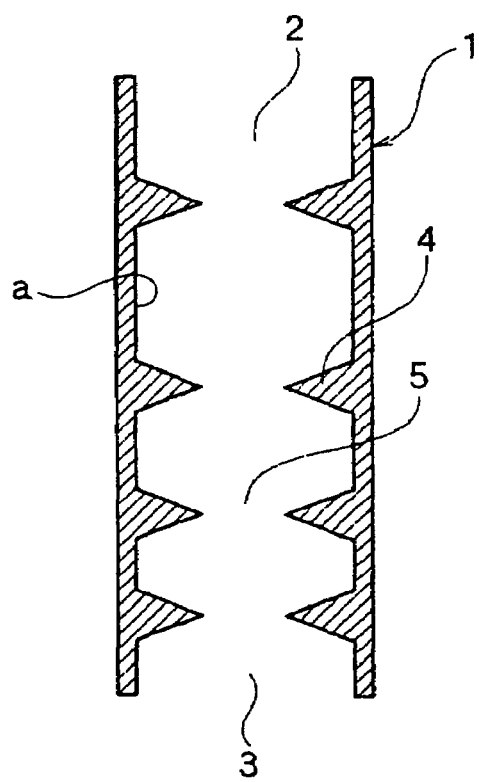
FIG. 6 is a schematic sectional view showing a further representative embodiment of the tubular reaction vessel according to the present invention.

In a further embodiment, the protrusion height H may be changed (be sequentially increased) as shown in FIG. 5. Although not shown, the embodiment of FIG. 5 may be turned upside down (so that H is sequentially decreased). In a still further embodiment, the intervals P alone may be changed as shown in FIG. 6. Although not shown, the embodiment of FIG. 6 may be turned upside down.

Figure 7:
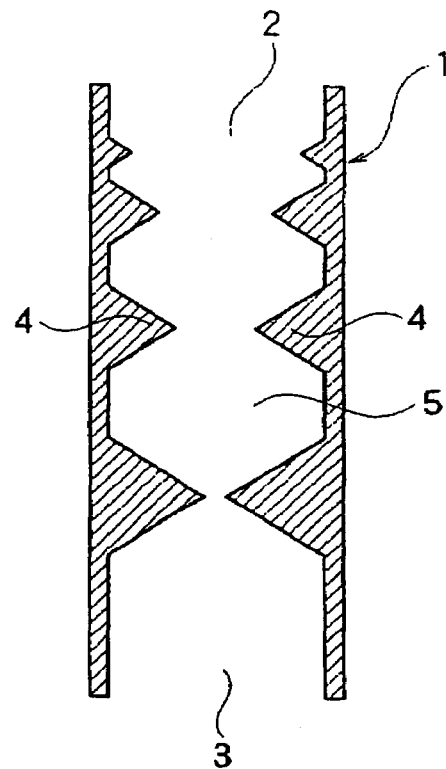
FIG. 7 is a schematic sectional view showing a further representative embodiment of the tubular reaction vessel according to the present invention.

In a yet further embodiment, various embodiments of the protrusion height H, skirt width Q and interval P may be arbitrarily combined. For example, the protrusion height H, the skirt width Q and the intervals P may be gradually increased as shown in FIG. 7.

The heating energy from heating means, for example high frequency wave in the case of high-frequency heating, tends to be concentrated to the orifice-provided regions, and therefore the internal temperature is often raised, possibly resulting in breakage of the tubular reaction vessel. Accordingly, it is desirable that the thickness of the reaction vessel is reduced by concaving the external wall in the orifice-provided region to prevent overheating.

Figure 26:
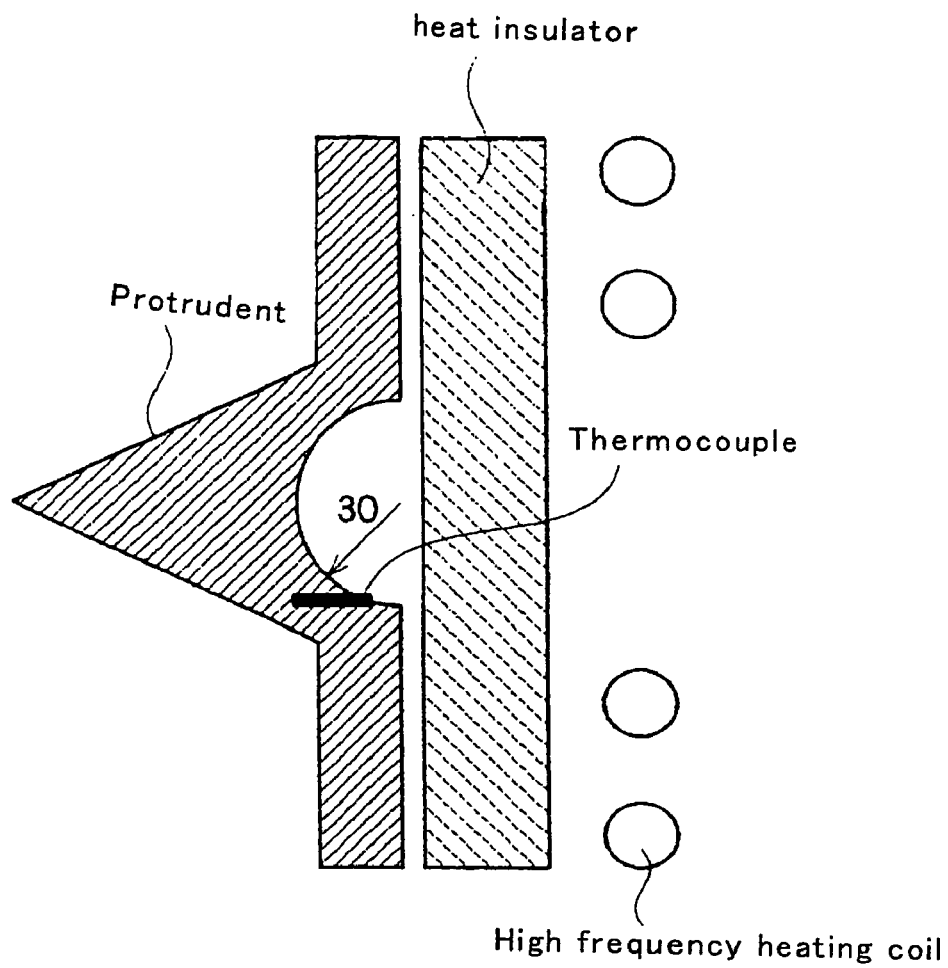
FIG. 26 is a schematic sectional view showing another embodiment of protrusions of the tubular reaction vessel according to the present invention.

For example, the external wall is desirably concaved semi-circularly as shown in FIG. 26. The concave depth is not particularly limited. For example, the external wall may be concaved to a depth such that the distance from the bottom of the semicircular concave to the orifice top is equal to the thickness of the tubular reaction vessel. There is no problem if the concave depth is smaller. Although the semicircular concave will be appropriate, the concave may be semi-spindle shaped so as to reduce the thickness of the reaction vessel wall near the lower surface of the orifice because heat is most often concentrated to the orifice's lower surface to overheat the area. The reduction thickness of the reaction vessel wall from the external wall prevents heat from being concentrated to the orifice, so that the overheating the inside of the orifice can be prevented, leading to enhanced durability of the tubular reaction vessel.

In an optimum embodiment of the protrusion arrangement, the aforementioned various provision embodiments will be appropriately selected and adjusted such that the silicon deposition efficiency will be most enhanced depending on the reaction vessel diameter or the gas feeding rate.

That is, it is an industrial advantage of the present invention that a gas heating process in the tubular reaction vessel 1 may be designed arbitrarily by appropriately selecting and adjusting the aforesaid provision embodiments of the flow resistance-increasing regions. Namely, the present invention achieves the following:

the distribution of the heating energy to the tubular reaction vessel 1 can be equalized to reduce operating costs, and most importantly, the invention provides means whereby a silicon deposition process, in which the gas heating temperature and the consumption by reaction of the feedstock gas continually change, can be designed such that the maximum efficiency will be achieved in all the areas of the deposition (wall) surface of the tubular reaction vessel 1, and ultimately the entire deposition surface can be utilized with maximum efficiency.

Figure 15:
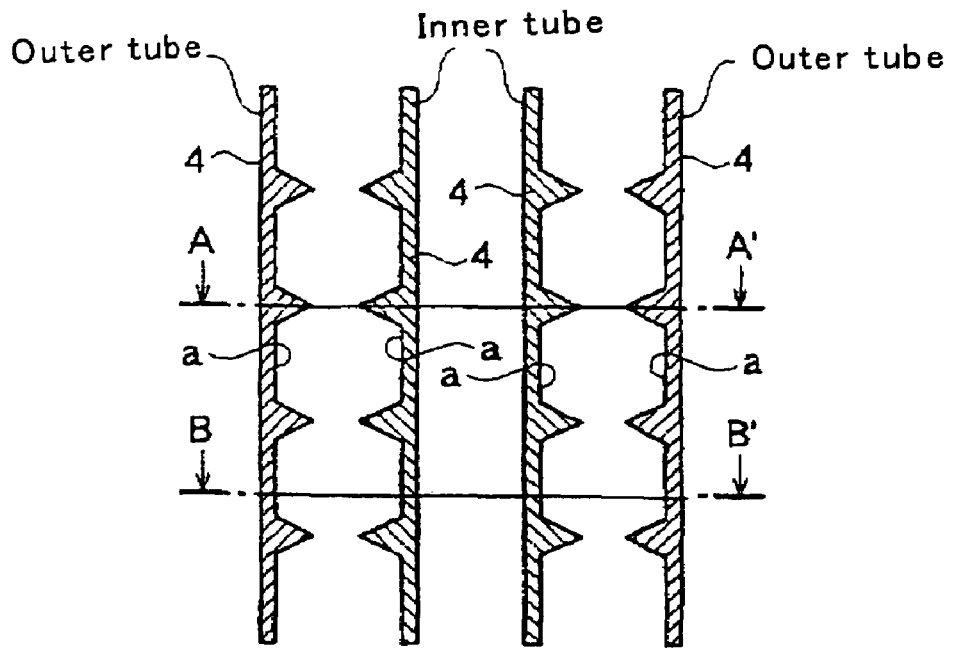
FIG. 15 is a schematic sectional view showing a further representative embodiment of the tubular reaction vessel according to the present invention.
Figure 15:
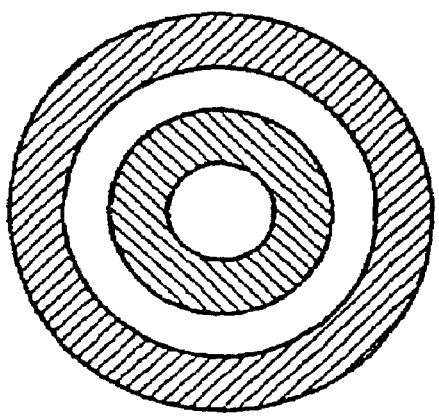
Figure 15:
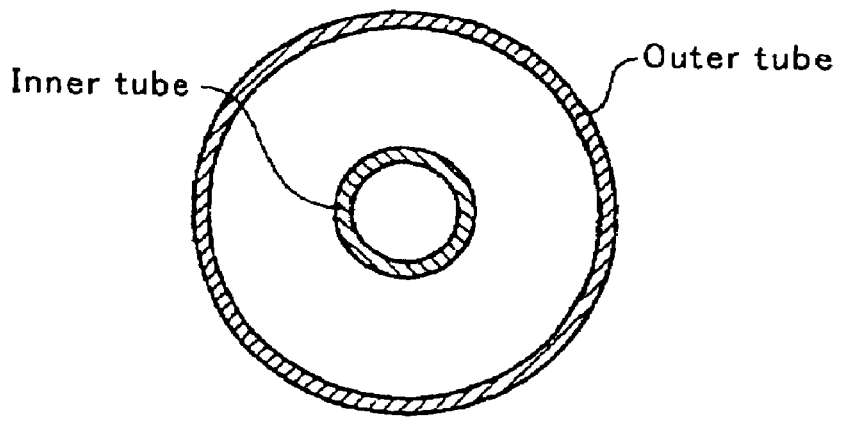
Figure 16:
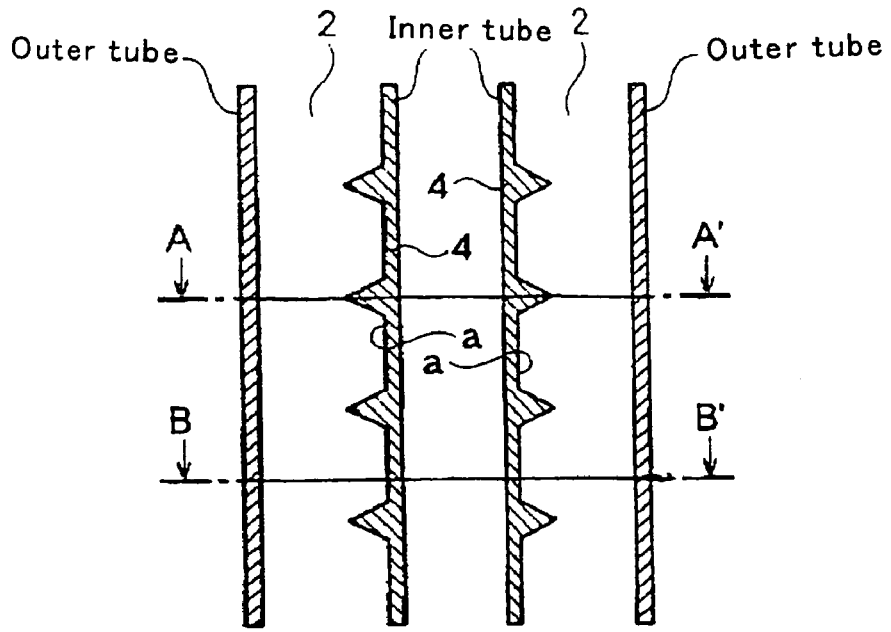
FIG. 16 is a schematic sectional view showing a further representative embodiment of the tubular reaction vessel according to the present invention.
Figure 16:
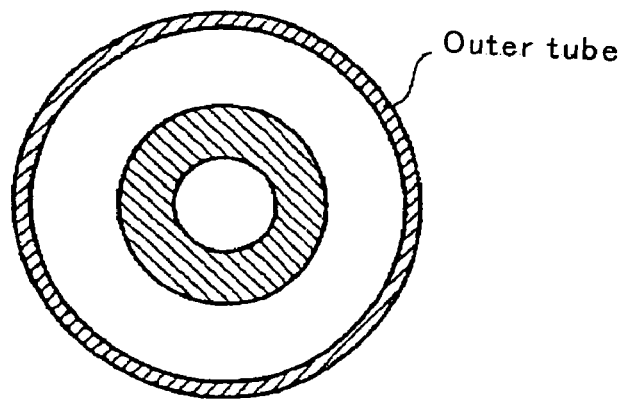
Figure 16:
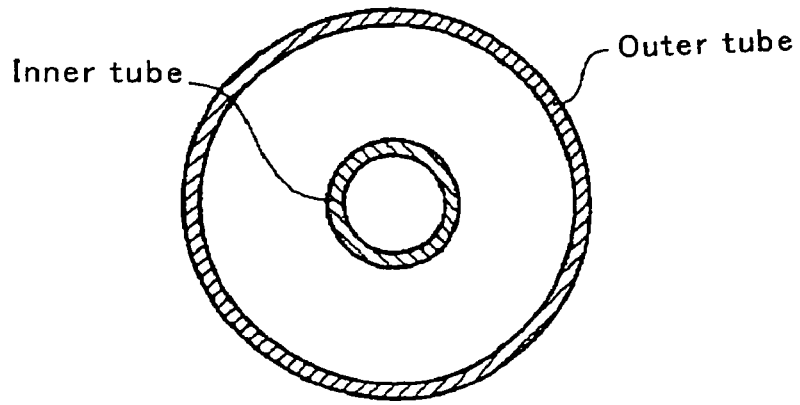

As described above, the reaction vessel that is circumferentially continuous circular slit in horizontal cross section consists of an outer tube and an inner tube. In the thus-shaped reaction vessel, the flow resistance-increasing regions may be favorably provided on both the external wall of the inner tube and the internal wall of the outer tube as shown in FIG. 15; or may be formed only on the external wall of the inner tube as shown in FIG. 16; or, although not shown, may be formed only on the internal wall of the outer tube.

Figure 8:
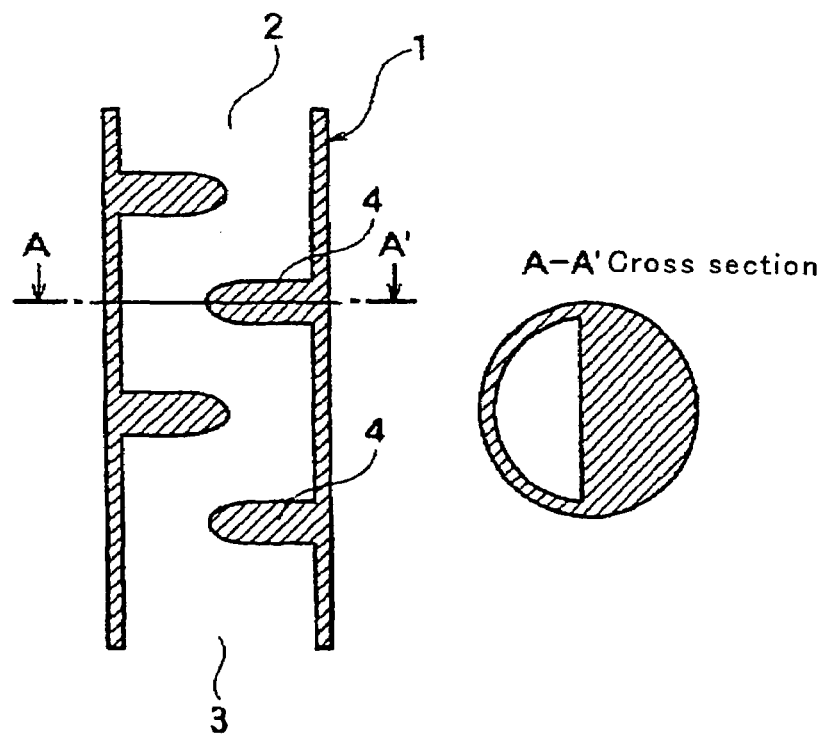
FIG. 8 is a schematic sectional view showing a further representative embodiment of the tubular reaction vessel according to the present invention.
Figure 9:
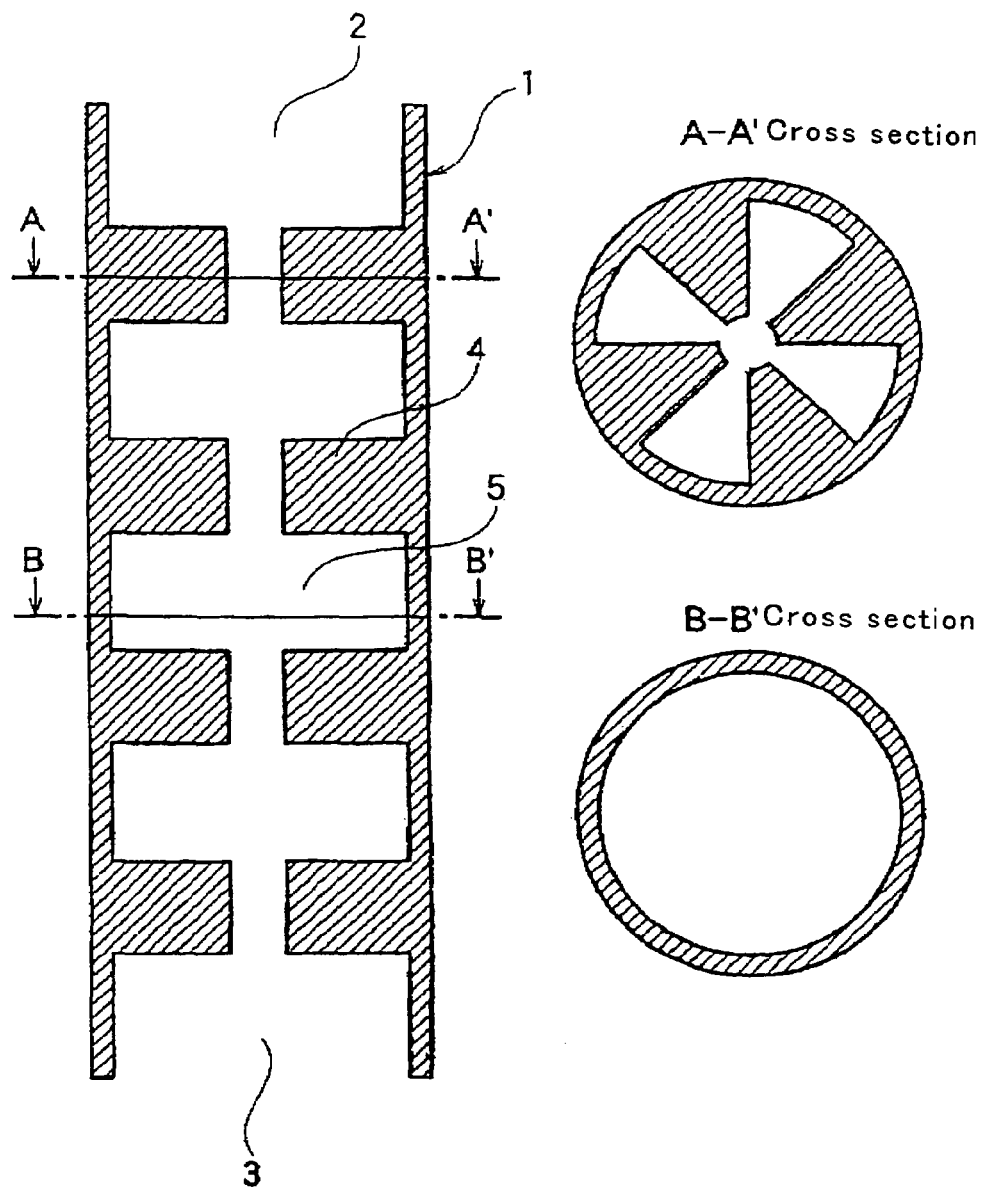
FIG. 9 is a schematic sectional view showing a further representative embodiment of the tubular reaction vessel according to the present invention.

In further embodiments of the protrusions, protrusions that do not circulate on the internal wall (sometimes referred to as baffle plates) may be provided as illustrated in FIGS. 8 and 9. The protrusions having these shapes are capable of the same effects as those shown in FIG. 1. In a modified embodiment of FIG. 9, although not shown, the protrusions may be inclined like gas turbine blades to swirl the stream of the silicon deposition feedstock gas in the reaction vessel, or to arbitrarily combine clockwise and counterclockwise swirls to achieve higher degree of mixing.

For the baffle plates as well, the protrusion cross sectional shape, height H, width Q, protrusion number and interval P may be determined similarly to the orifice embodiments.

The material of which the protrusions are composed may be arbitrarily selected from the materials of the reaction vessel, which is favorable to reduce the contamination of the deposited silicon with impurities. More favorably, the protrusions and the reaction vessel 1 are made of materials having similar characteristics.

Of the aforementioned protrusions, the orifices are preferable in the present invention, and the vertical cross section of the protrusion is preferably triangular in view of drip down of the silicon melt. Further preferably, the opening of the protrusion will center align with the reaction vessel, in which case the feedstock gas can be uniformly heated anywhere in the reaction vessel.

2) Concave

The concave indicates a depressed area on the internal wall surface. Although, the concave cannot be deeper than the thickness of the reaction vessel 1, nevertheless, the effect obtained per concave may be smaller than achieved per protrusion, but the concaves do have a function to reduce the upward flow that inhibits diffusion of the feedstock gas onto the deposition surface and to mix the feedstock gas in the vicinity of the reaction vessel central axis with the upward flow.

Figure 10:
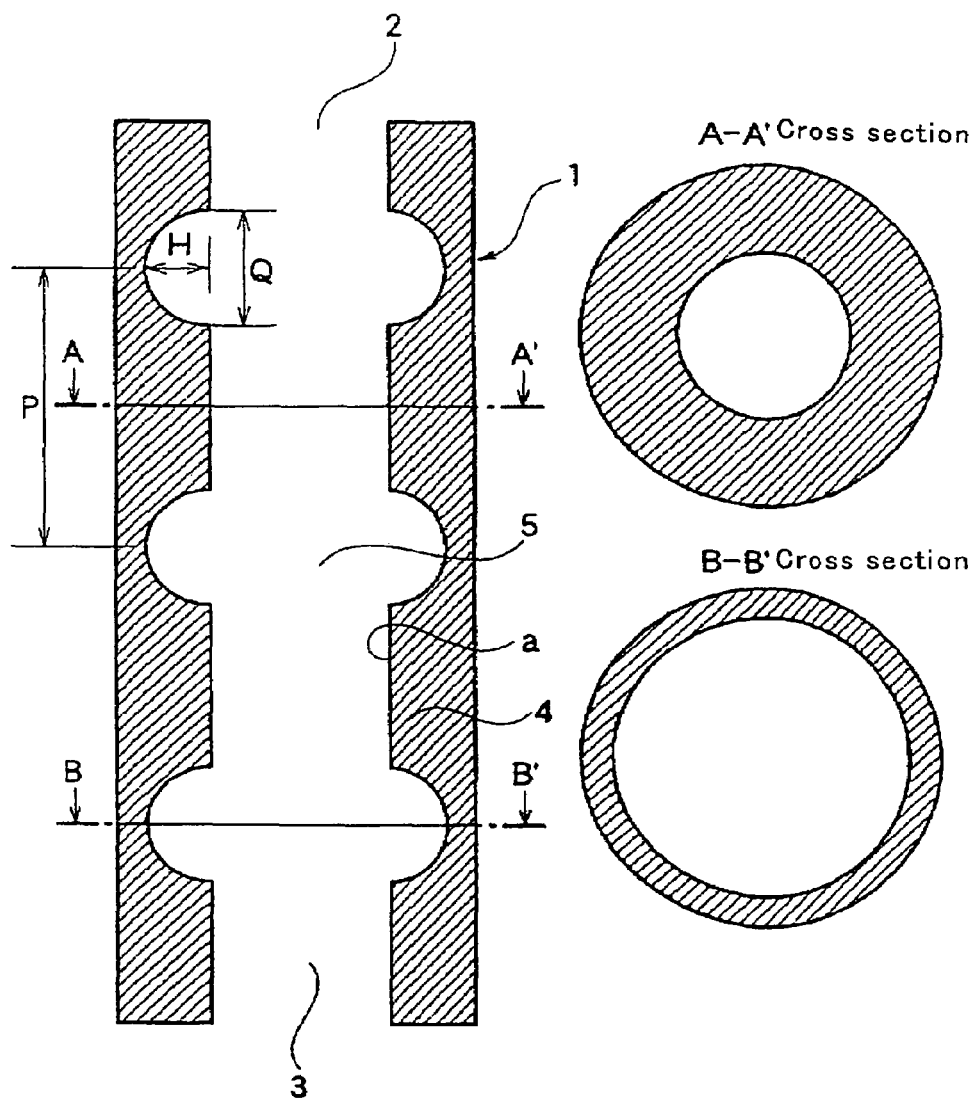
FIG. 10 is a schematic sectional view showing a further representative embodiment of the tubular reaction vessel according to the present invention.
Figure 11:
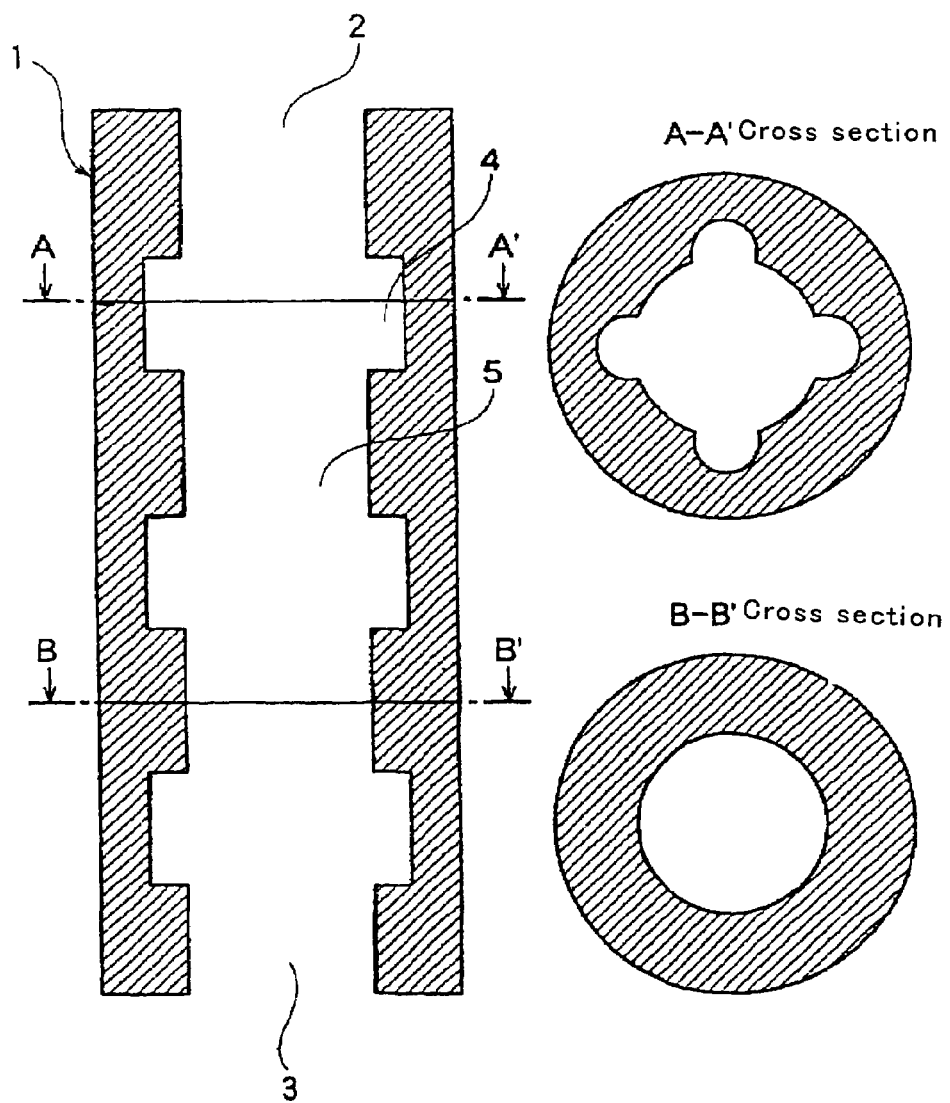
FIG. 11 is a schematic sectional view showing a further representative embodiment of the tubular reaction vessel according to the present invention.

The cross sectional shapes of the concave may be substantially the same as the orifices and the baffle plates, except that the protrusions are recessed. Specific examples are shown in FIGS. 10 and 11.

The concave depth H and the frontage width Q correspond to the protrusion depth H and the skirt width Q respectively. For higher effectiveness, the depth H and the frontage width Q desirably have a relation such that Q/H is in the range of 0.5 to 5, and preferably 1 to 3. The depth H cannot be larger than the thickness of the reaction vessel 1.

In the case of the concave, a higher effect can be achieved as the intervals P become smaller. Although not shown, a preferred embodiment of the concaves is such that the concaves are arranged on the entire deposition surface like dimples on a golf ball.

3) Slope

Figure 12:
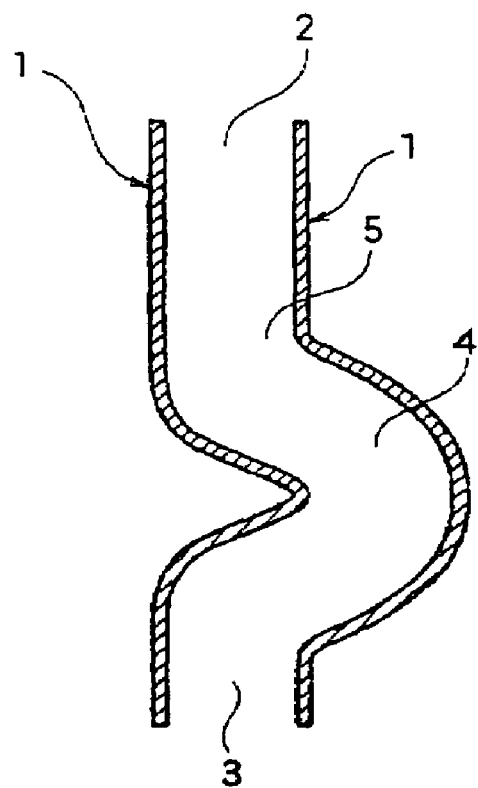
FIG. 12 is a schematic sectional view showing a further representative embodiment of the tubular reaction vessel according to the present invention.

In an embodiment of the slope, the tubular reaction vessel in part or entirely forms the flow resistance-increasing region. Specifically, the slope is not particularly limited as long as the flow direction of the silicon deposition gas can be changed. An example is a meander shape as shown in FIG. 12. Although not shown, the meander may be spiral.

The slope may be a continual curve in the tubular reaction vessel or may be a combination of linear and curved parts.

In the present invention, the aforesaid protrusions, concaves and slopes may be provided in arbitrary combination. Further, the size (height, depth, width, spiral sharpness) and provision number and interval may be determined arbitrarily and may be combined arbitrarily.

[Silicon Production Process]

The silicon production process according to the present invention employs the above-described tubular reaction vessel. According to the method, a silicon deposition feedstock gas containing a silane is introduced through the silicon deposition feedstock gas inflow opening, and polycrystalline silicon is produced from the silane-containing silicon deposition feedstock gas in the heated reaction vessel.

The silanes include known silanes used as silicon material gases. Specific examples include monosilane, trichlorosilane (TCS), silicon tetrachloride (STC), monochlorosilane and dichlorosilane. Of these, monosilane and TCS are preferable because highly pure products meeting industrial needs are easily available in large quantities. Further, it is most preferable that the feedstock gas is based on TCS that causes little silicon fine powder.

The feedstock gas may be diluted prior to use. The diluting gas is preferably one that does not adversary affects the silicon production. Particularly, when the unreacted feedstock gas is circulated for use, the diluting gas is preferably based on hydrogen.

The feedstock gas will be preferably diluted such that the feedstock gas constitutes 1 to 30 mol %, and more preferably 3 to 20 mol % of the diluted gas. To perform dilution using the diluting gas, the feedstock gas may be diluted beforehand and supplied from the feedstock gas supply tube. It is also possible that the diluting gas is supplied to the reaction vessel through a respective supply tube separately from the feedstock gas.

In a silicon production reaction apparatus of the present invention, the pressure at which the feedstock gas is reacted is not particularly limited as long as industrial production is feasible and stable yield is ensured. For example, the pressure may range from atmospheric pressure to 3 MPaG, and preferably from atmospheric pressure to 1 MPaG.

In the silicon production reaction apparatus, the dwell times of the gases in a predetermined-volume reaction vessel may be adjusted appropriately depending on reaction conditions such as temperature and pressure. The average dwell time will range from 0.001 to 60 seconds, preferably from 0.01 to 10 seconds, and more preferably from 0.05 to 1 second. The dwell time in this range permits a sufficiently efficient reaction rate of the feedstock gas while achieving higher effects of the flow resistance-increasing regions.

Conditions of the silicon production in the present invention are not particularly limited as long as the aforesaid tubular reaction vessel is used. To reduce undesirable by-products, the reaction conditions such as the tubular reaction vessel size, reaction vessel structure such as configuration of the flow resistance-increasing regions, feed ratio of the silane to hydrogen, gas feed rate, deposition surface temperature and operation pressure, are preferably manipulated such that the silane-containing feedstock gas supplied into the production apparatus will be reacted to achieve a silane reaction rate of at least 25%, and preferably at least 30%.

Figure 17:
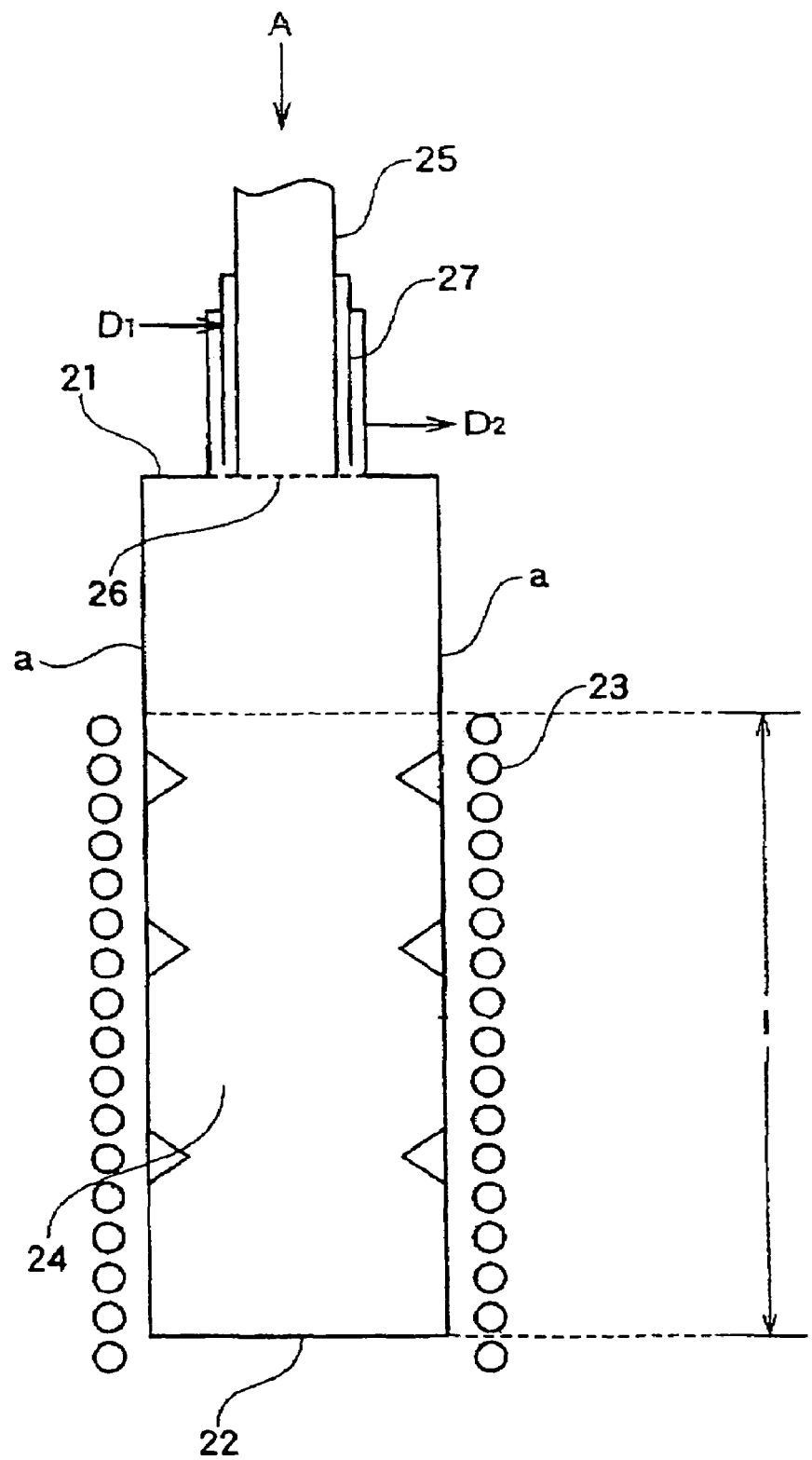
FIG. 17 is a schematic sectional view showing a silicon production apparatus according to the present invention.

Hereinbelow, the silicon production reaction apparatus used in the present invention and operation thereof will be described with reference to FIG. 17. FIG. 17 is a schematic sectional view of a silicon production reaction apparatus using the tubular reaction vessel according to the present invention. The silicon production reaction apparatus has a structure such that a silicon deposition feedstock gas A is passed through a space 24 enclosed by a wall (a) extending in a vertical direction to constitute a reaction vessel 21, silicon is deposited and molten on a heated surface of the wall (a) facing the space 24, and the silicon melt is allowed to drip down through an opening (deposited silicon discharge opening) 22 at a lower end.

In the silicon production reaction apparatus shown in FIG. 17, heating means 23 is arranged so as to surround the external wall of the reaction vessel.

The heating means 23 of the silicon production reaction apparatus may be known heating means without limitation as long as it is capable of heating the surface of the wall (a) facing the space 24 above the melting point of silicon. The melting point of silicon is generally considered to be in the range of 1410 to 1430° C. Specifically, the heating means may be a type capable of heating the surface of the wall (a) facing the space 24 by means of external energy. Examples of such heating means include high-frequency heating means such as high-frequency heating coils, heating wire means, and infrared heating means. Of these, the present invention optimally employs a high-frequency heating device capable of efficient heating of the reaction vessel with less energy, alternatively it is also possible to use different types of heating means in combination.

The heating means 23 may be controlled by single temperature control means in the whole range of a silicon deposition reaction section I. Alternatively, the heating means 23 may be divided into two parts, namely upper and lower parts, or more parts and each part may be temperature controlled separately.

When the flow resistance-increasing regions are protrusions, particularly orifices, it is preferable that, provided that a protrusion-to-protrusion interval is defined as a zone, the heating means is arranged per at least one zone and each heating means is controlled to supply optimum heat energy depending on the heat removed by the reaction gas between the protrusions.

When the flow resistance-increasing regions are protrusions, particularly orifices, heat is concentrated in the protrusion-provided areas and the temperature of the areas is often raised to 2000° C. or above. Such over heating may result in breakage of the tubular reaction vessel, and part of the reaction vessel material may elute and much of it may be mixed with the deposited silicon.

To prevent overheating at the protrusions, a tubular reaction vessel as described hereinabove may be employed in which the thickness of the reaction vessel outside the protrusion is reduced by concaving the external wall.

In another embodiment in which heating is preformed using a high-frequency (namely, electromagnetic wave) heating method, the heating means is arranged such that the heating value in the protrusion-provided areas is smaller than the rest. For example, this can be achieved by increasing the distance from the external wall of the protrusion-provided areas to the heating coil relative to the other areas (namely, protrusion-free areas), or by arranging the heating coil other than near the protrusion-provided areas.

It is also appropriate that a shield against the high frequency wave is arranged on the external wall of the protrusion-provided areas to reduce transmission of the high frequency wave. Specifically, the shield against the high frequency wave can be achieved by inserting copper plates to reduce the high frequency energy to the areas, so that the overheating at the protruded areas may be prevented. The embodiment of reducing the thickness of the reaction vessel wall and the embodiment of reducing the high frequency energy from the high frequency heating coil may be performed individually or in combination.

In the silicon production reaction apparatus using the high frequency heating means, a heat insulator is desirably interposed between the wall (a) and the heating means 23 to enhance the heating energy efficiency. When the heating wire means or infrared heating means is used, a further heat insulator is preferably arranged around the outer periphery of the heating means 23.

Referring to FIG. 17, the feedstock gas is supplied through a feedstock gas supply tube 25. The feedstock gas supply tube 25 is preferably equipped with cooling means 27 to prevent decomposition of the silanes when the supply tube is heated by the heat transferred through conduction from the reaction vessel 21 or the heat transferred through radiation.

That is, the cooling means 27 preferably cools the internal wall of the feedstock gas supply tube 25 to a temperature at which the feedstock gas supplied will not self-decompose, namely, to about 500° C. or below. Further, it is preferable for reducing thermal load neat the inflow opening of the reaction section I that the feedstock gas is preheated and the cooling means 27 is adopted such that the feedstock gas supplied will have a temperature of 100 to 500° C., and preferably 200 to 400° C.

A specific embodiment of the cooling means 27 is shown in FIG. 17, in which a jacket is arranged around the feedstock supply tube 25 and a refrigerant is circulated in the jacket from D1 to D2, this embodiment is simple and preferable. Suitable refrigerants include water, heat transfer oil, steam and gases. Instead of the jacket system, although not shown, the feedstock gas supply tube 25 may be a multiring nozzle and a diluting gas may be used as a refrigerant. It is also appropriate to arrange a radiator plate around the feedstock gas supply tube 25.

The material of the feedstock gas supply tube 25 may be the same as the vertically extending wall (a) described later, or may be iron or stainless steel.

The silicon deposition feedstock gas supplied from the feedstock gas supply tube 25 is reacted to deposit silicon in the reaction section I of the reaction vessel 21. In the deposition reaction, the inner surface of the wall (a) in the reaction section I may be temperature controlled to at least the melting point of silicon to cause the silicon melt to continually drip down. In an alternative method, the surface is temperature controlled to a temperature blow the silicon melting point at which deposition of silicon is feasible, solid silicon is temporarily deposited, and the surface temperature is increased to at least the silicon melting point to melt and drip down part of or all the deposited silicon. In the method in which the solid silicon is temporarily deposited, the temperature may be locally in excess of the melting point of silicon.

Silicon is generally deposited on a surface having a temperature of 600° C. or above. To improve the silicon deposition efficiency, the surface temperature is preferably 1100° C. or above, more preferably 1250° C. or above, and optimally 1300° C. or above. In view of durability of the reaction vessel 21, the upper limit of the silicon deposition temperature is preferably 1700° C., and more preferably 1600° C.

The tubular reaction vessel of the invention provides a turbulent gas flow because of the flow resistance-increasing regions, and the average gas temperature can be uniformly increased.

To achieve a high reaction rate of the feedstock gas, high yield of deposited silicon and reduction of undesirable by-products, the average gas temperature per unit quantity of the gas discharged from the tubular reaction vessel is desirably 700° C. or above, preferably 800 to 1500° C., and more preferably 900 to 1400° C. This gas temperature may be achieved by employing the aforesaid structure of the tubular reaction vessel and silicon production conditions according to the present invention, leading to effective production of silicon. Without the flow resistance-increasing regions such as protrusions, uniform heating is impossible and an increased proportion of the feedstock is passed without being heated, so that the average gas temperature is lowered to about 600° C.

The temporarily deposited solid silicon may be molten and dropped for recovery by increasing the output of the heating means 23 and/or lowering the gas feed rate to raise the wall surface temperature, these methods may be performed singly or in combination.

It is important that the wall (a) of the reaction vessel 21 is heated such that at least part of the surface including a lower end portion is heated to the silicon melting point or above. There is particularly no limitation on the range in which the surface of the wall (a) facing the space 24 is heated to the silicon melting point or above, provided that the area includes a lower end portion. To achieve a sufficient silicon yield, the heating area preferably ranges from the lower end to 20% or more, and preferably 30% or more of the total length. To reduce the hardly removable silicon deposit and ensure long-term stable operation, the heating area preferably ranges from the lower end to 90% or less, and preferably 80% or less of the total length. In the case where a feedstock gas outlet opening 26 is positioned above the uppermost part of the heating means 23 as shown in FIG. 17, the heating area will range from the uppermost part of the heating means 23 to a length along the reaction section I.

When the feedstock gas outlet opening 26 is positioned above the uppermost part of the reaction section I as shown in FIG. 17, less heat is removed by the feedstock supply tube 25 and the energy efficiency of the heating means 23 can be enhanced. In this case, however, the heat of the reaction section I is conducted to an upper portion of the wall (a) and consequently silicon is often deposited above the reaction section I. When the deposition reaction is continuously carried out in this state, the silicon scales often resulting in blockage.

Figure 18:
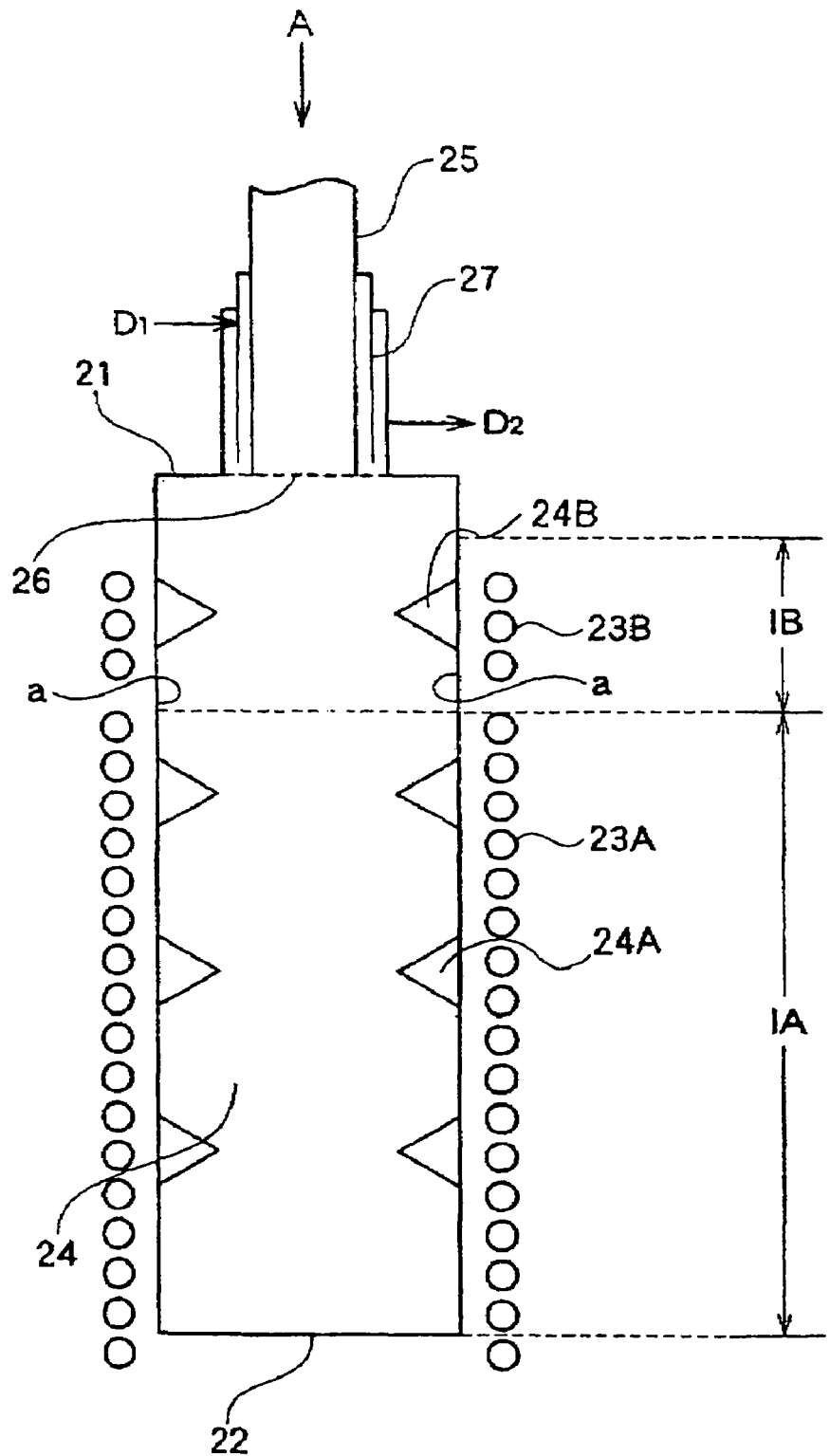
FIG. 18 is a schematic sectional view showing a silicon production apparatus according to the present invention.

To avoid this result, the reaction section is preferably divided into two parts as shown in FIG. 18, in this case, a principal (deposition) reaction section IA for essentially depositing silicon and heating means 23A for the principal reaction section IA are arranged, and an auxiliary reaction section IB for silicon deposition attributed to the conducted heat above the principal reaction section and heating means 23B for the auxiliary reaction section are arranged.

That is, the heating means 23A and the heating means 23B in FIG. 18 are adopted to be output controlled separately. Generally, the heating means 23A for the principal reaction section IA is mainly used to heat the reaction vessel 21, on the other hand, the heating means 23B for the auxiliary deposition section IB is usually power controlled to zero or a small output. During the heating, the temperature of the wall surface of the auxiliary reaction section IB is raised by the heat transferred through conduction from the heating means 23A, and the silicon deposition temperature is reached locally and a small amount of silicon is possibly deposited. Therefore, the output of the heating means 23B is sometimes increased so that the silicon deposited in the auxiliary reaction section IB is molten and dropped. By this means, silicon scaling can be prevented stably over a long term.

When the principal reaction section IA and the auxiliary reaction section IB are provided as described above, respective flow resistance-increasing regions 24A and 24B are preferably arranged in the reaction sections. Specifically, the flow resistance-increasing region 42B provided in the auxiliary reaction section IB increases the contact efficiency of the feedstock gas with the reaction vessel wall, prevents the heat transferred through conduction from the heating means 23A from transferring endlessly upward in the reaction vessel, and restricts the silicon deposition section to within the auxiliary reaction section IB. As a result, the heat energy otherwise lost in the upper part can be recovered maximally and silicon scaling growth can be prevented further effectively.

In addition to the above method of silicon scaling elimination by the heating means 23B as illustrated in FIG. 18, a method may be adopted in which an etching gas such as hydrogen chloride is intermittently supplied to remove the attached scales. These methods may be performed in combination.

Figure 19:
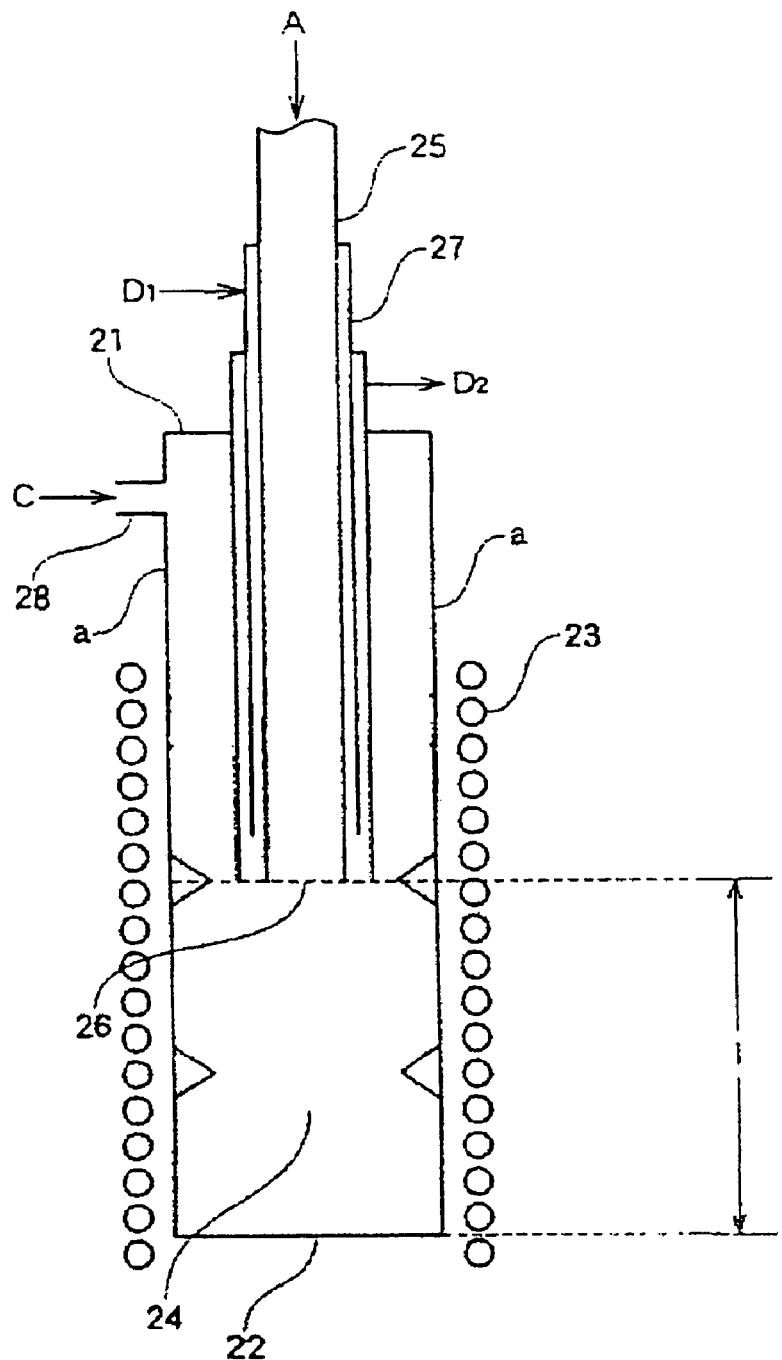
FIG. 19 is a schematic sectional view showing a silicon production apparatus according to the present invention.

FIG. 19 shows an embodiment in which the feedstock gas outlet opening 26 is at a position equal to or lower than the upper end of the heating means 23.

In the silicon production using the reaction vessel structure as illustrated in FIG. 19, the silicon deposition feedstock gas can flow round into a space between the vertically extending wall (a) and the feedstock gas supply tube 25. To prevent silicon from depositing and growing in the space, a seal gas (seal gas C, seal gas supply tube 28) is preferably supplied to this low temperature region. The seal gas is suitably one not detrimental to the silicon production. Suitable examples of the seal gases include inert gases such as argon and helium, and hydrogen and nitrogen.

To obtain an enhanced effect of the seal gas, it is a preferred embodiment that the seal gas is appropriately mixed with a gas capable of etching the silicon, for example hydrogen chloride.

Figure 20:
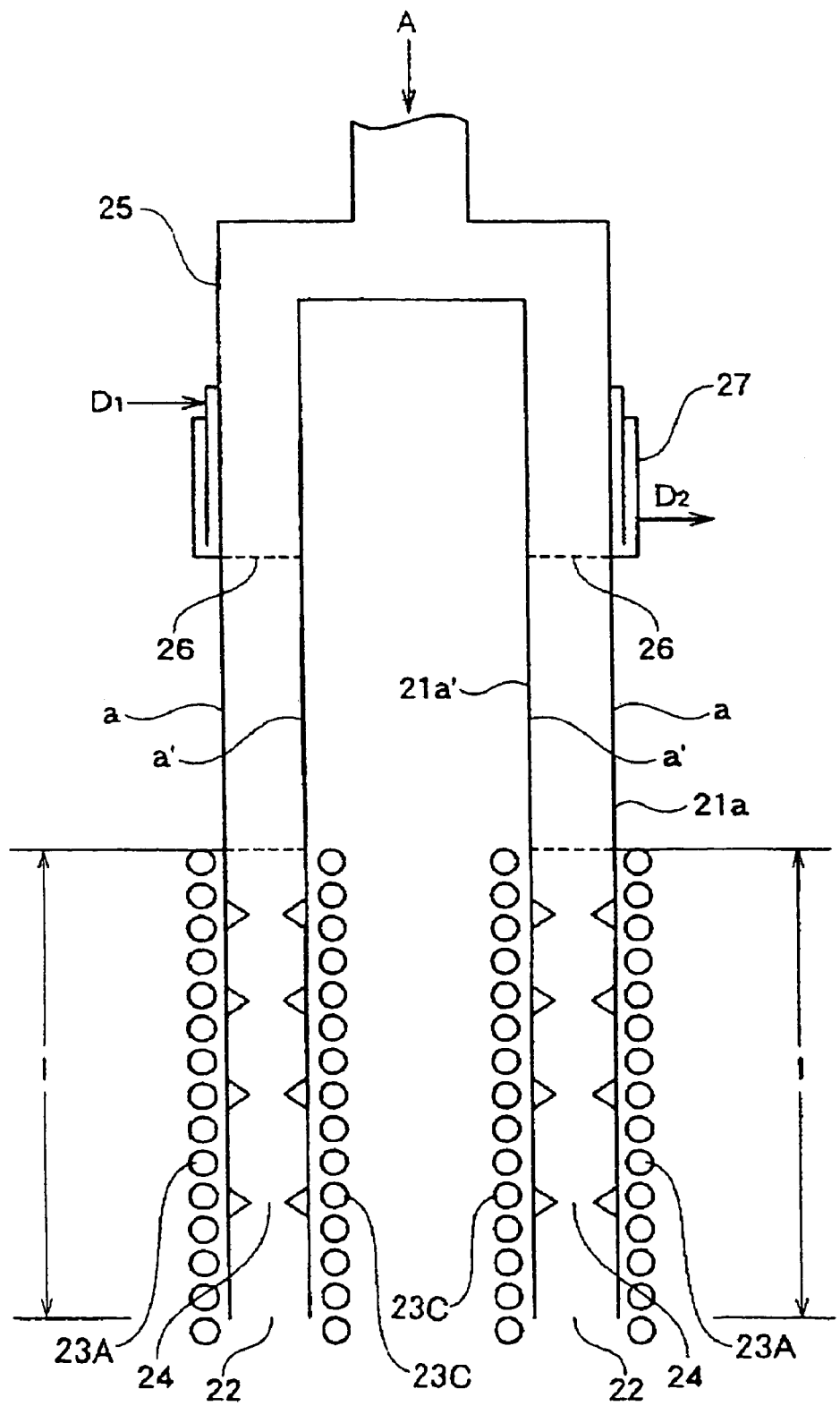
FIG. 20 is a schematic sectional view showing a silicon production apparatus according to the present invention.

FIG. 20 is a schematic sectional view of a silicon production reaction apparatus for use in the invention, in which the tubular reaction vessel has a double ring structure. The reaction vessel has a structure such that the feedstock gas is passed through a space 24 created between an internal wall (a) of an outer tube 21a and an external wall (a') of an inner tube 21a', silicon is deposited and molten on a heated surface facing the space 24, and the silicon melt is allowed to drip down through a lower end opening 22. Heating means 23A such as high frequency heating means is arranged around the outer periphery of the outer tube.

The ring-shaped reaction vessel shown in FIG. 20 may be provided with auxiliary heating means 23C inside the inner tube for sufficiently heating the surface of the inward wall (a') facing the space 24. (The provision of the heating means 23C is not always necessary.) The heating means 23C may be similar to the heating means 23A using a high frequency wave or the like, or may be such heating means that uses a heating wire or infrared ray.

In another embodiment, it is also possible in order to effectively heat the inward wall (a') that the outward wall (a) is made of a thin carbon material having a thickness of about 10 mm and the inward wall (a') is made of a thick carbon material having a thickness of at least 20 mm. According to this embodiment, the space-facing surfaces of the outward and inward walls (a) and (a') can be effectively heated together with only the outward heating means 23A such as high frequency heating means. In a still preferable embodiment, the outward wall (a) may comprise a carbon fiber-reinforced carbon composite material.

Figure 27:
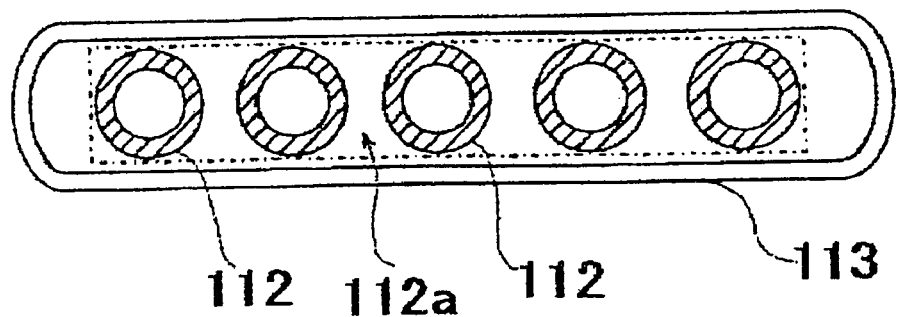
FIG. 27 is a schematic sectional view showing another representative embodiment of the tubular reaction vessel according to the present invention.

In the present invention, it is also possible that a plurality of the tubular reaction vessels are aligned and the heating means such as high frequency heating means is arranged so as to surround the outer periphery of the grouped reaction vessels with a spacing from each of the reaction vessels. Specifically, as shown in FIG. 27, reaction vessels 112 are aligned in a horizontal direction and a high frequency heating coil 113 is wound along the outer periphery of the reaction vessels grouped in line (within a dashed line) 112a. According to the above embodiment in which a plurality of the tubular reaction vessels are heated with a high frequency heating coil wound around the outer periphery of the vessels, there is provided a compact-size silicon production apparatus. The arrangement of a plurality of the reaction vessels is not particularly limited to the linear alignment as shown in FIG. 27, and two-line arrangement and cyclic arrangement are possible as long as the reaction vessels are arranged in a horizontal direction along the inner periphery of the high frequency heating means, however, for effective heating with a high frequency wave from the high frequency heating means, at least part of the tube walls of the reaction vessels will be adjacent to the inner peripheral surface of the high frequency heating means.

The structure of the silicon production reaction apparatus used in the invention is not particularly limited to the aforementioned, and other known structures as described in JP-A-2002-29726 may be adopted without limitation.

Figure 21:
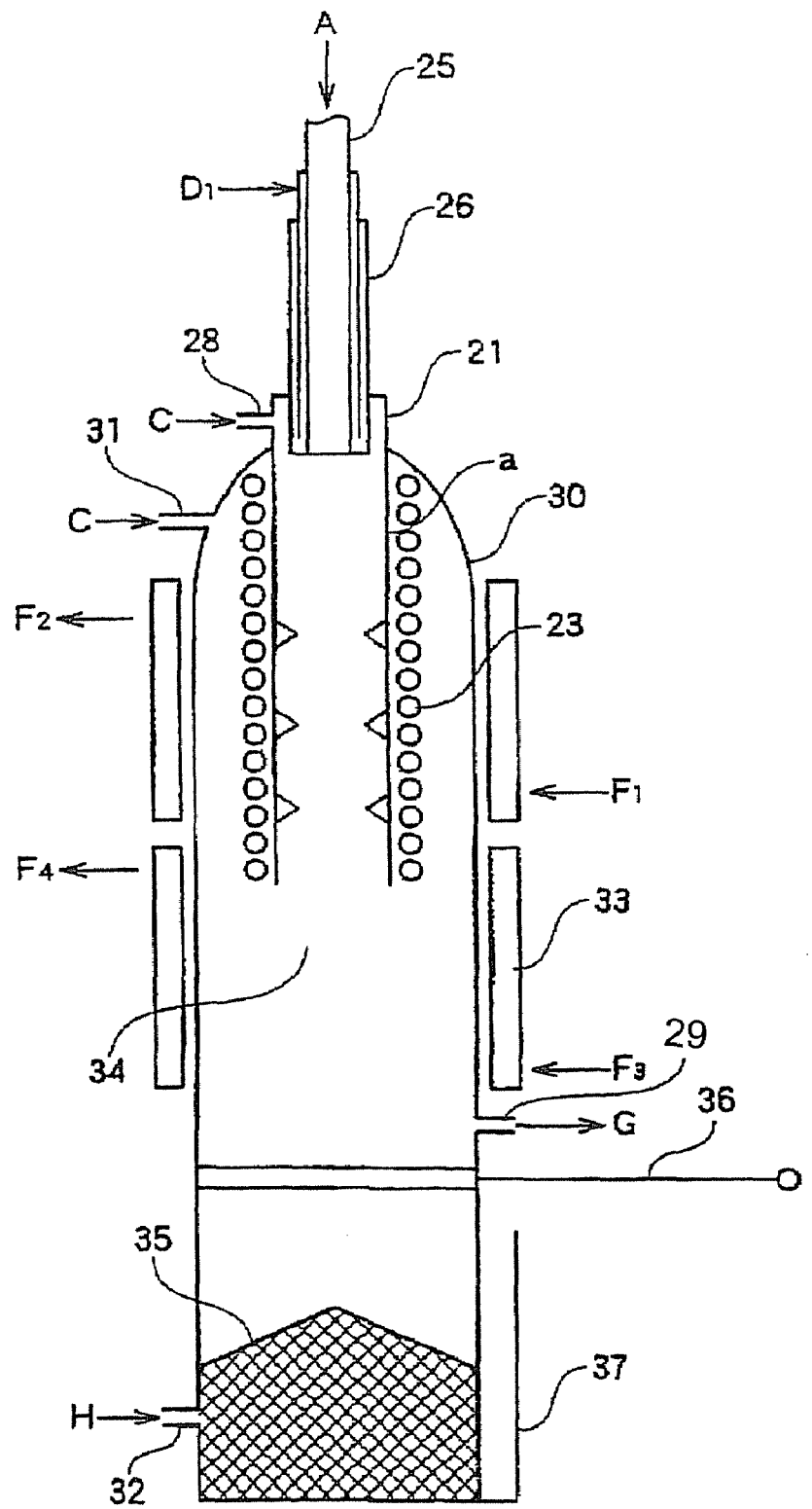
FIG. 21 is a schematic sectional view showing a silicon production apparatus according to the present invention.

A specific example is illustrated in FIG. 21. The illustrated reaction vessel 21 is provided in a closed vessel 30 connected with an exhaust gas outlet tube 29 for an exhaust gas G. Because this reaction vessel is isolated from the outside air, silicon can be obtained in high purity and the exhaust gas can be recovered effectively. The closed vessel 30 may be provided with a cooling chamber in a lower part. The cooling chamber forms a room in which silicon 35 dropped down from the reaction vessel 21 is collected. The closed vessel 30 may be further provided with, in addition to the exhaust gas outlet tube 29, cooling jackets 33 through which refrigerants are circulated from $F_1$ to $F_2$ and from $F_3$ to $F_4$, and a cold space 34 cooled by the jackets. The lower cooling chamber may be provided with a cooling gas supply tube 32 though which a cooling gas H is supplied for cooling the silicon 35. Furthermore, a partition plate 36 may be provided in the cold space 34 to permit recovery of the silicon 35 from a recovery opening 37. Preferably, a plurality of the partition plates 36 will be provided to improve safety in the silicon recovery.

EXAMPLES

Hereinbelow, the present invention will be described in greater detail by Examples. However, it should be construed that the invention is not limited thereto.

Example 1

Figure 22:
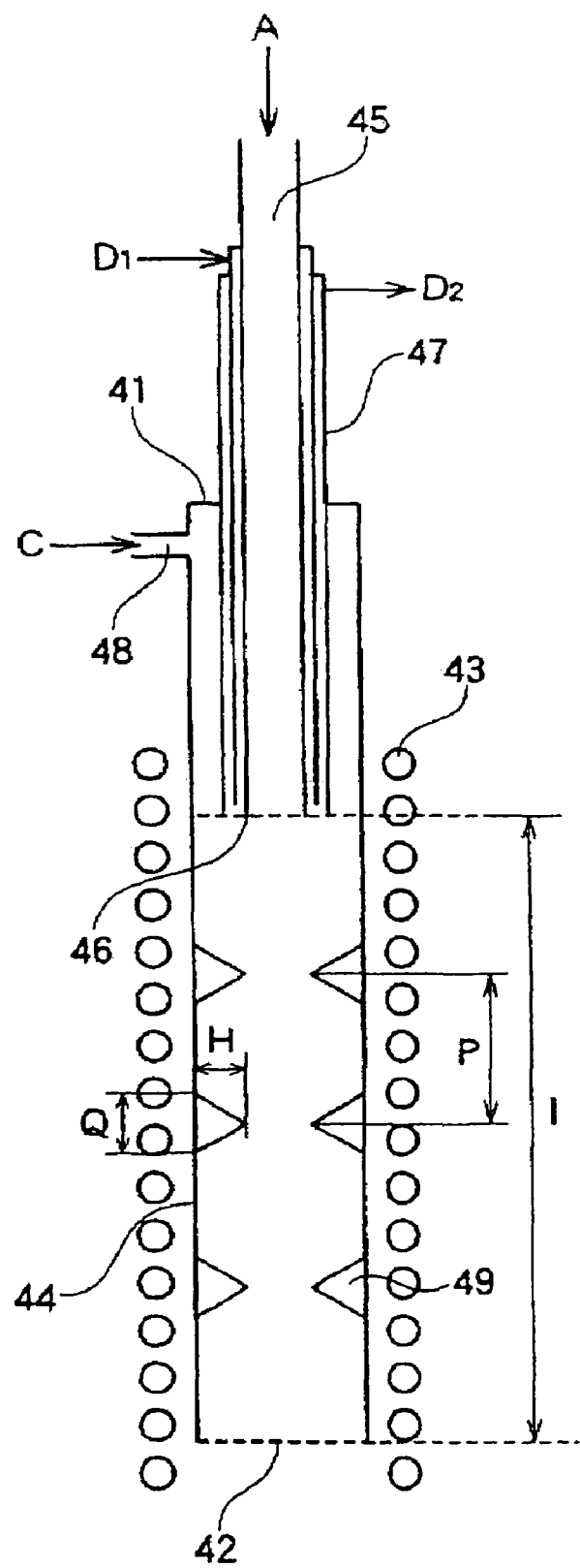
FIG. 22 is a schematic sectional view showing a silicon production apparatus used in Example 1.

The following description will be presented with reference to a schematic view of FIG. 22.

A tubular reaction vessel 41 made of general-purpose isotropic graphite was provided, which was cylindrical and straight in a longitudinal direction and had an inner diameter of 150 mm, a reaction section length I of 600 mm and a thickness of 15 mm. Heating means 43 was a high frequency heating system. The high frequency heating coil as the heating means 43 for the reaction section I extended along the reaction section I of the tubular reaction vessel 41 to a length of 100 mm from each of the upper and lower ends of the reaction section I. The frequency of the high frequency heating means was 8 kHz. A 50 mm thick carbon fiber heat insulator was arranged between the reaction vessel 41 and the heating means 43, extending from 30 mm above the lower end of the reaction vessel 41 to the upper end of the heating means 43.

Flow resistance-increasing regions provided inside the tubular reaction vessel 41 were ring-shaped protrusions (orifices) on the internal wall of the reaction vessel, were triangular in cross section and were made of the same material as the reaction vessel. The protrusion height H was 60 mm, the protrusion skirt width Q was 30 mm, and the protrusion interval P was 125 mm. The protrusions were provided at three points on the internal wall of the reaction vessel 41.

A feedstock gas supply tube 45 was equipped with a cooling mechanism of water cooling jacket system. A feedstock gas inflow opening 46 was a circular opening 40 mm in inner diameter. The feedstock gas inflow opening 46 was at a position 100 mm below the upper end of the heating means 43, so that the distance from the inflow opening 46 of the feedstock supply tube 45 to a deposited silicon discharge opening 42 at a lower end of the reaction vessel 41 became equal to the length I of the reaction section.

A gas mixture was supplied through the feedstock gas supply tube 45 at rates of 35 kg/h for trichlorosilane and 100 $Nm^3$/h for hydrogen, while water was passed through cooling means 47 of the feedstock gas supply tube 45, hydrogen was supplied through a seal gas supply tube 48 at a rate of 5 $Nm^3$/h, and the temperature of the internal wall surface of the reaction vessel 41 was raised to and maintained at 1300 to 1400° C. by the heating means 43. The reaction pressure was about 50 kPaG.

The composition of the reaction exhaust gas was analyzed by gas chromatography, resulting in a trichlorosilane reaction rate of about 43% and a silicon deposition rate of about 1.5 kg/h. After the deposition reaction had been performed for 2 hours, the supply of trichlorosilane was terminated and the hydrogen feed rate was halved, while the heating output was increased by 20%. As a result, the silicon deposited was molten and dropped down in about 15 minutes. The silicon collected in a reservoir below the reaction vessel weighed approximately 3 kg. The total amount of silicon fine powder and silane oligomer generated was very small, less than 0.5% relative to the silicon.

Example 2

Figure 23:
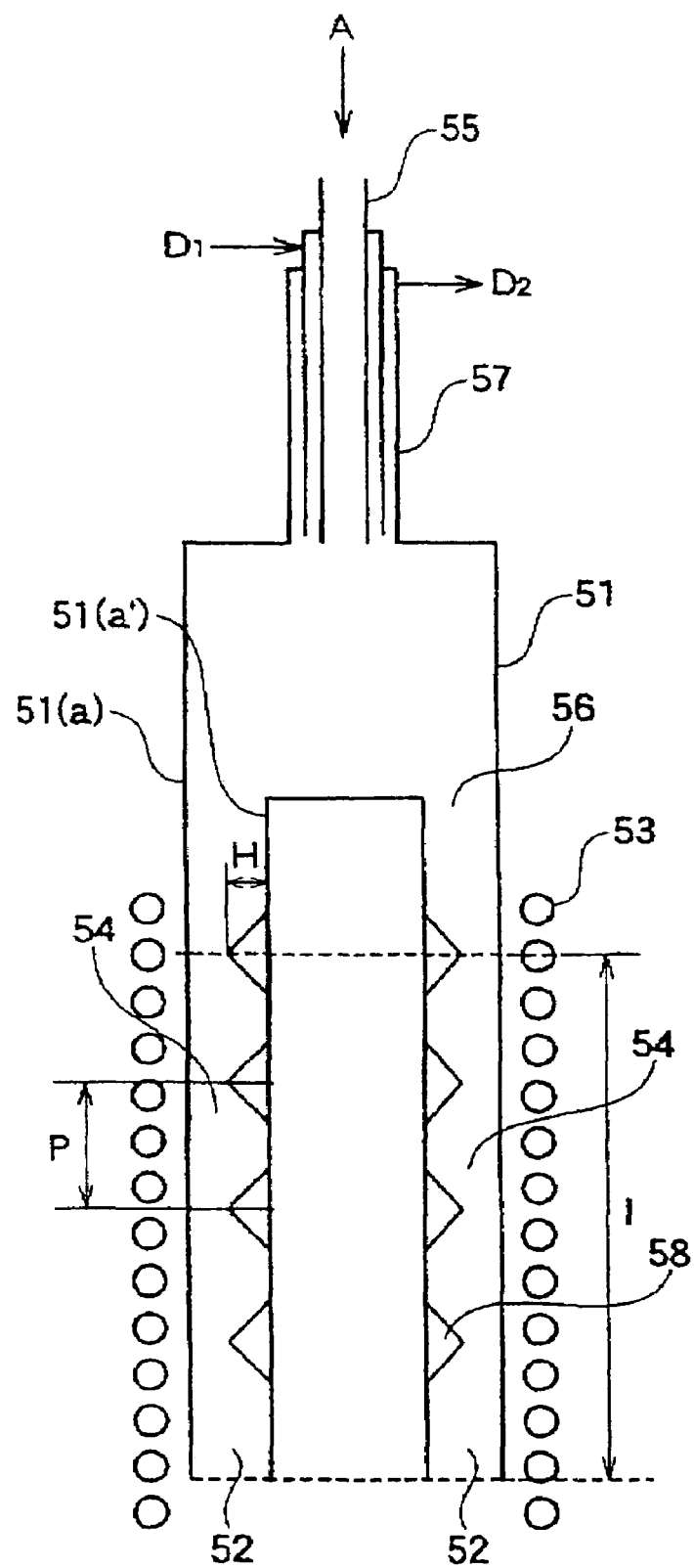
FIG. 23 is a schematic sectional view showing a silicon production apparatus used in Example 2.

The following description will be presented with reference to a schematic view of FIG. 23.

A tubular reaction vessel 51 was a vessel with a ring-shaped cross section that consisted of an outer tube 51(*a*) and an inner tube 51(*a'*) having a smaller inner diameter. The outer tube 51(*a*) was an isotropic graphite cylinder 250 mm in inner diameter and 5 mm in thickness. The inner tube 51(*a'*) was a general-purpose isotropic graphite cylinder having an inner diameter of 200 mm and a thickness of 15 mm. The reaction vessel had a straight reaction section having a length I of 1 m, and an opening 52 at a lower end.

A space 54 was created between the outer tube 51(*a*) and the inner tube 51(*a'*). A heating coil capable of generating a high frequency wave of 1 kHz was arranged as heating means 53 to heat part of the space-facing surfaces with which the feedstock gas could contact, to at least the melting point of silicon. The heating coil was arranged so as to enclose the outer tube 51(*a*) over a range from 0.15 m below the upper end to 0.1 m below the lower end of the outer tube 51(*a*). A 50 mm thick carbon fiber heat insulator was arranged between the outer tube 51(*a*) and the heating coil, extending from the upper end to 0.03 m below the lower end of the outer tube 51(*a*), and another similar heat insulator was arranged above an upper lid of the inner tube 51(*a'*).

Flow resistance-increasing regions 58 were provided only on the peripheral surface of the external wall of the inner tube 51(*a'*). The flow resistance-increasing regions 58 on the external wall of the inner tube 51(*a'*) were ring-shaped protrusions made of isotropic carbon. They were triangular in vertical cross section and had a height H of 12 mm from the wall surface of the inner tube 51(*a'*), and a skirt width Q of 20 mm. The protrusions were provided in four positions at intervals P of 250 mm.

A feedstock gas supply tube 55 was made of stainless steel and had a liquid-flow jacket structure as cooling means 57. The feedstock gas supply tube was arranged so as to cover the entire upper part of the outer tube 51(*a*) of the reaction vessel.

The upper end of the inner tube 51(*a'*) was covered with a lid of the same material as the reaction vessel, so that a feedstock gas inflow opening 56 was created at the uppermost space between the outer tube 51(*a*) and the inner tube 51(*a'*).

The feedstock gas supply tube 55 was cooled by passing water, and the outer tube 51(*a*) and the inner tube 51(*a'*) were heated by the high frequency heating means 53 to a temperature of 1300 to 1400° C.

A gas mixture was supplied through the feedstock gas supply tube 55 at rates of 175 kg/h for trichlorosilane and 500 $Nm^3$/h for hydrogen. The reaction pressure was about 50 kPaG. The composition of the reaction exhaust gas was analyzed by gas chromatography, resulting in a silicon deposition rate of 9.5 kg/h and a trichlorosilane reaction rate of about 55%.

After the deposition reaction had been performed for 2 hours, the supply of trichlorosilane was terminated and the hydrogen feed rate was halved, while the heating output was increased by 20%. As a result, the silicon deposited was molten and dropped down in about 15 minutes. The silicon collected in a reservoir below the reaction vessel weighed approximately 19 kg. The total amount of silicon fine powder and silane oligomer generated was very small, less than 0.5% relative to the silicon.

Example 3

Figure 24:
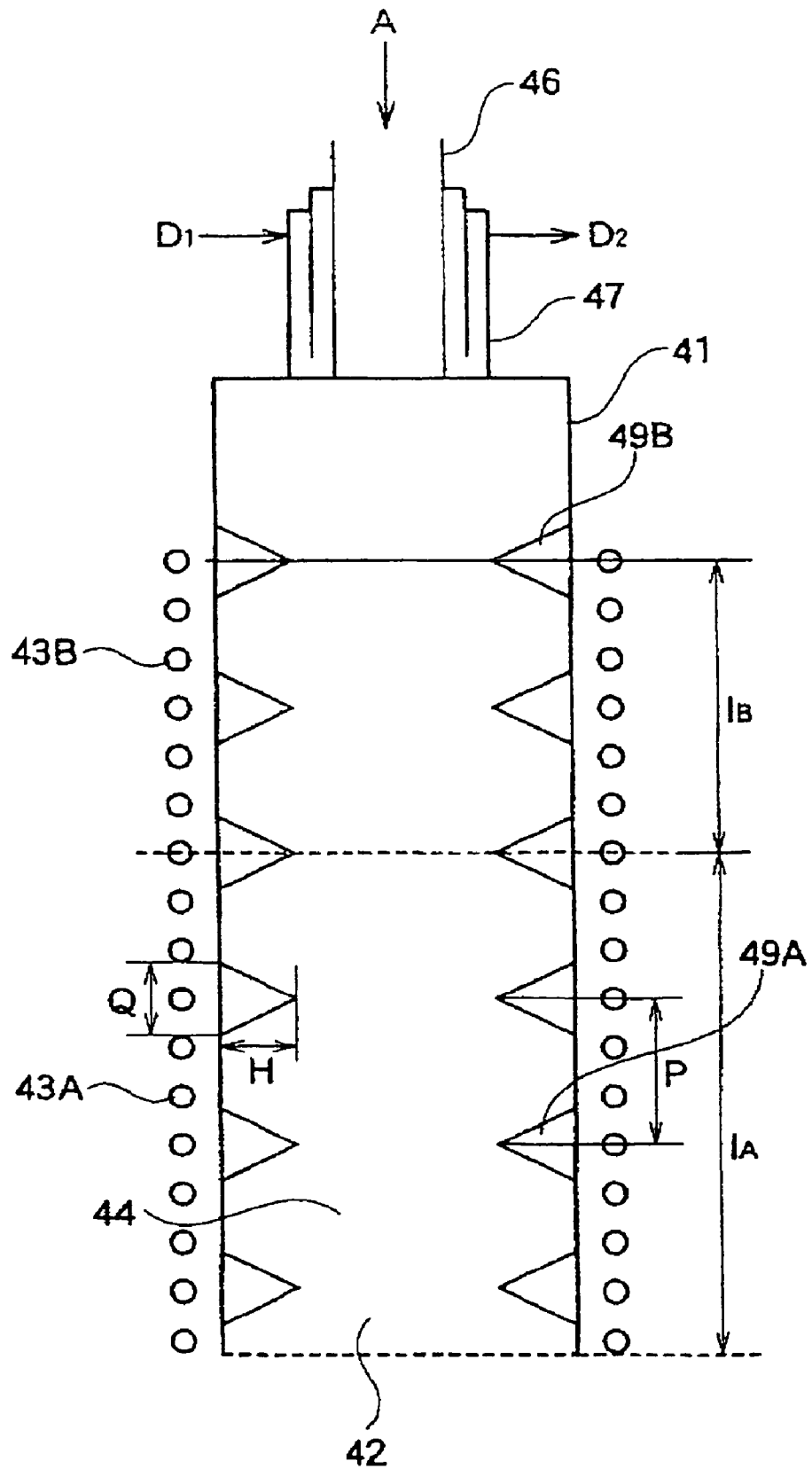
FIG. 24 is a schematic sectional view showing a silicon production apparatus used in Example 3.

The following description will be presented with reference to a schematic view of FIG. 24.

A tubular reaction vessel 41 made of general-purpose isotropic graphite was provided, which was cylindrical and had an inner diameter of 210 mm, a thickness of 25 mm and a length of 4000 mm. The reaction vessel 41 included two parts: a principal reaction section IA ranging from the lower end of the reaction vessel to a height of 2800 mm, and an auxiliary reaction section IB having a length of 560 mm above the principal reaction section IA Heating means used herein were, high frequency heating systems. A high frequency heating coil 43A as the heating means for the principal reaction section IA extended from the upper end of the principal reaction section IA to 50 mm below the lower end of the reaction vessel 41. A high frequency heating coil 43B as the heating means for the auxiliary reaction section IB extended to the same height and in the same length as the auxiliary reaction section IB. The frequency of the high frequency heating means was 5 kHz, and each of the heating coils 43A and 43B were separately output adjustable. A 50 mm thick carbon fiber heat insulator was arranged between the reaction vessel 41 and the heating means 43A and 43B, extending from 30 mm above the lower end of the reaction vessel 41 to the upper end of the reaction vessel 41.

Flow resistance-increasing regions 49A and 49B provided inside the tubular reaction vessel 41 were ring-shaped protrusions (orifices) on the internal wall of the reaction vessel. They were triangular in cross section and were made of the same material as the reaction vessel. The protrusion height H was 70 mm, the protrusion skirt width Q was 80 mm, and the protrusion interval P was 580 mm. The protrusions 49A (principal reaction section) and 49B (auxiliary reaction section) were provided in six points at the regular intervals, starting from the upper end of the auxiliary reaction section IB to the lower end of the principal reaction section IB of the reaction vessel 41.

A feedstock gas supply tube 45 was a stainless steel tube with an inner diameter of 150 mm and was equipped with a jacket as cooling means 47 in which a 250° C. heat transfer oil was circulated. The surface of the reaction section IA facing a reaction space 44 was temperature controlled in the range of 1450 to 1500° C. while zeroing the output of the heating means 43B and increasing the output of the heating means 43A.

A gas mixture was supplied into the reaction vessel 41 through the feedstock gas supply tube 45 at rates of 600 kg/h for trichlorosilane and 1000 Nm$^3$/h for hydrogen to initiate reaction, and silicon melt started to drip down continually. The reaction pressure was about 50 kPaG.

The supply of trichlorosilane alone was terminated after every two hours of reaction under the above conditions, and the output of the heating means 43B was increased so that the inner surface temperature of the auxiliary reaction section IB reached about 1500° C. After the lapse of 15 minutes, the output of the heating means 43B was lowered to zero and the supply of trichlorosilane was restarted. This cycle was continually carried out over a period of 6 days (144 hours), but the reaction vessel 41 did not suffer any blockage by silicon or other troubles.

During the deposition reaction by supplying trichlorosilane, the reaction exhaust gas was analyzed by gas chromatography to determine its composition, resulting in a trichlorosilane reaction rate of about 52% and a silicon deposition rate of about 19.5 kg/h. That is, the reaction over a period of 144 hours produced about 2500 kg of silicon. The total amount of silicon fine powder and silane oligomer generated was very small, less than 0.5% relative to the silicon.

Example 4

The silicon deposition reaction was performed in the same manner as described in Example 3, except that the ring-shaped protrusions (orifices) had an outer periphery as shown in FIG. 26.

FIG. 26 is an enlarged sectional view of a vicinity of the ring-shaped protrusion. As illustrated, an outer peripheral portion of the ring-shaped protrusion (orifice) was concaved to provide a semi-circular ditch 30 mm in radius, and high frequency heating coils were arranged other than near the protrusion-provided area. This configuration was adopted for all the ring-shaped protrusions of the tubular reaction vessel used in Example 3, and the other apparatus and reaction conditions were the same as in Example 3.

As a result, the surface temperature of the ring-shaped protrusions was maintained at 1500° C. or below, the isotropic carbon of which the tubular reaction vessel was made was substantially free from deterioration, and the silicon produced had a reduced carbon concentration.

Comparative Example 1

Figure 25:
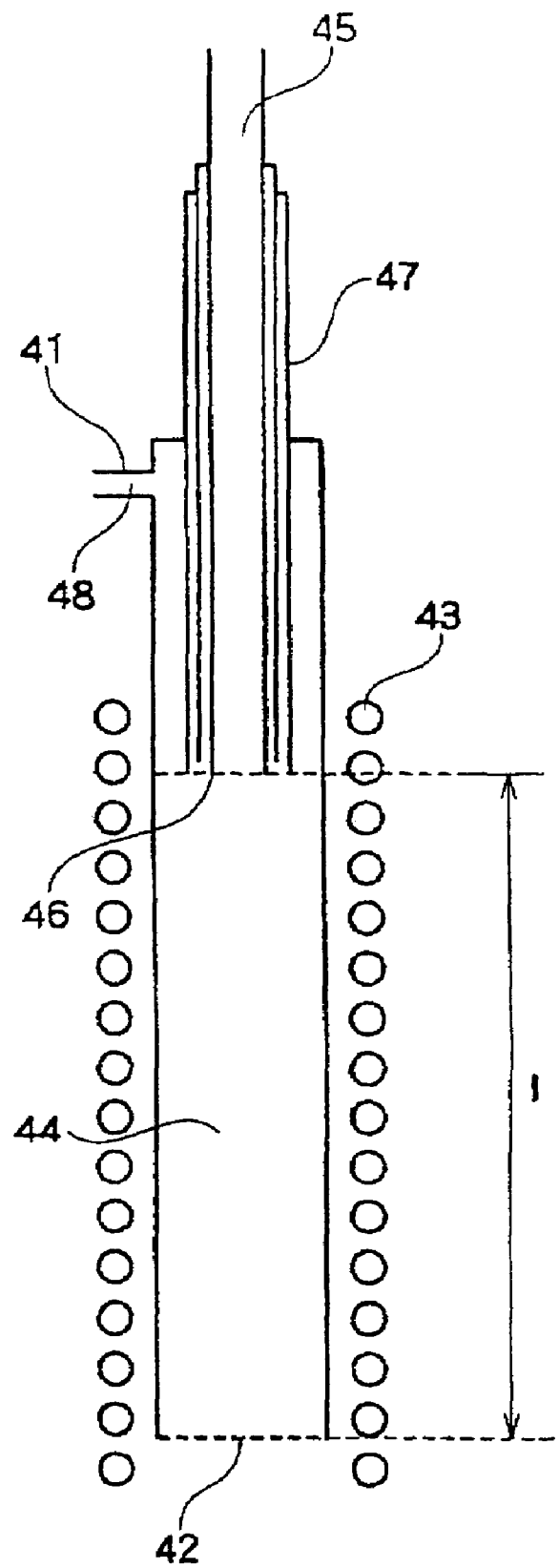
FIG. 25 is a schematic sectional view showing a silicon production apparatus used in Comparative Example 1.

The silicon deposition reaction was performed using the same reaction apparatus (shown in FIG. 22, the numerals have the same indications) and under the same conditions as in Example 1, except that the reaction vessel 41 had no flow resistance-increasing regions 49 on the internal wall as illustrated in FIG. 25. The reaction resulted in a trichlorosilane reaction rate of 22% and a silicon yield of about 1.6 kg. The total amount of silicon fine powder and silane oligomer generated from the reaction was not less than 3% relative to the silicon.

The invention claimed is:

1. A process for producing silicon, comprising:
   providing a tubular reaction vessel that comprises a longitudinally-extending wall with a space thereinside and heating means which heats the surface of the wall at a silicon deposition temperature, wherein a silicon deposition feedstock gas inflow opening and a deposited silicon discharge opening are provided at an upper portion and a lower end portion respectively and a flow resistance-increasing region is created on a wall surface of the tubular reaction vessel that is contacted with a feedstock gas, wherein the plurality of flow resistance-increasing regions are protrudent or concave regions;
   introducing a silicon deposition feedstock gas containing a chlorosilane through the silicon deposition feedstock gas inflow opening; and
   producing polycrystalline silicon from the chlorosilane-containing silicon deposition feedstock gas in the heated reaction vessel.

\* \* \* \* \*